United States Patent
Afkhami et al.

(10) Patent No.: US 9,008,159 B2
(45) Date of Patent: Apr. 14, 2015

(54) RATE ADAPTATION FOR DATA COMMUNICATION

(71) Applicant: QUALCOMM Incorporated, San Diego, CA (US)

(72) Inventors: Hassan Afkhami, Ocala, FL (US); Purva R. Rajkotia, Orlando, FL (US); Manjunath Anandarama Krishnam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 13/738,583

(22) Filed: Jan. 10, 2013

(65) Prior Publication Data

US 2014/0192846 A1 Jul. 10, 2014

(51) Int. Cl.
*H04B 1/38* (2006.01)
*H04B 3/46* (2006.01)
*H04B 3/54* (2006.01)
*H04L 27/26* (2006.01)

(52) U.S. Cl.
CPC ............... *H04B 3/46* (2013.01); *H04B 3/542* (2013.01); *H04L 27/2647* (2013.01)

(58) Field of Classification Search
CPC ............ H04L 27/2607; H04L 27/2662; H04L 27/2666; H04L 27/2602; H04L 27/261; H04W 28/06
USPC ......... 375/219, 220, 223, 226, 229, 260, 261, 375/267, 271, 295, 299, 316, 320, 322, 324, 375/340, 346
See application file for complete search history.

(56) References Cited

U.S. PATENT DOCUMENTS

| | | | |
|---|---|---|---|
| 6,714,511 B1 | 3/2004 | Sudo et al. | |
| 7,437,140 B2 | 10/2008 | Iwamura | |
| 7,664,955 B2 | 2/2010 | Newman et al. | |
| 7,684,502 B2 | 3/2010 | Kurobe et al. | |

(Continued)

FOREIGN PATENT DOCUMENTS

| | | |
|---|---|---|
| JP | 2000299712 A | 10/2000 |
| JP | 2001217896 | 8/2001 |

(Continued)

OTHER PUBLICATIONS

HomePlug Powerline Alliance Inc., "Home Plug Green PHY The Standard for In-Home Smart Grid Powerline Communications", Jun. 14, 2010, p. 1-17.

(Continued)

*Primary Examiner* — Hirdepal Singh
(74) *Attorney, Agent, or Firm* — DeLizio Gilliam, PLLC

(57) ABSTRACT

In some embodiments, a method includes receiving, at a receiver of a first device via a channel of a communication medium, multiple data transmissions. Each data transmission of the multiple data transmissions has a guard interval of multiple guard intervals, wherein the multiple guard intervals have different lengths. The method includes determining, based on signal characteristics of the multiple data transmissions, the data transmission from among the multiple data transmissions having a preferred physical data rate. The method includes setting a length of an adjusted guard interval for the channel for data communication from a transmitter of a second device to the receiver of the first device via the communication medium, to a length of the guard interval for the data transmission having the preferred physical data rate.

39 Claims, 13 Drawing Sheets

(56) References Cited

U.S. PATENT DOCUMENTS

| | | | |
|---|---|---|---|
| 7,916,815 B2* | 3/2011 | Foxcroft et al. | 375/343 |
| 8,340,234 B1* | 12/2012 | Cheng et al. | 375/348 |
| 8,665,908 B1* | 3/2014 | Zhang et al. | 370/474 |
| 2005/0276242 A1* | 12/2005 | Goto et al. | 370/328 |
| 2006/0165011 A1 | 7/2006 | Starr et al. | |
| 2007/0109971 A1 | 5/2007 | Yoshida et al. | |
| 2007/0211902 A1 | 9/2007 | Newman et al. | |
| 2007/0254693 A1* | 11/2007 | Furukawa | 455/553.1 |
| 2008/0170635 A1 | 7/2008 | Ochi et al. | |
| 2008/0279126 A1 | 11/2008 | Katar et al. | |
| 2008/0298382 A1 | 12/2008 | Galli et al. | |
| 2008/0298531 A1* | 12/2008 | Troulis et al. | 375/371 |
| 2009/0040930 A1 | 2/2009 | Yonge, III et al. | |
| 2009/0279616 A1 | 11/2009 | Hamanaka | |
| 2009/0279638 A1 | 11/2009 | Kurobe et al. | |
| 2009/0285321 A1* | 11/2009 | Schulz et al. | 375/267 |
| 2009/0300455 A1 | 12/2009 | Nakagawa | |
| 2009/0304126 A1* | 12/2009 | Sahara | 375/343 |
| 2010/0040086 A1* | 2/2010 | Kimura et al. | 370/474 |
| 2010/0054314 A1* | 3/2010 | Korobkov et al. | 375/222 |
| 2010/0100741 A1* | 4/2010 | Newman et al. | 713/171 |
| 2010/0183087 A1* | 7/2010 | Hosokawa et al. | 375/262 |
| 2010/0220650 A1 | 9/2010 | Rison | |
| 2010/0232333 A1* | 9/2010 | Higuchi et al. | 370/312 |
| 2010/0271972 A1 | 10/2010 | Fujii et al. | |
| 2010/0296521 A1 | 11/2010 | Martinez et al. | |
| 2010/0316140 A1 | 12/2010 | Razazian et al. | |
| 2011/0026617 A1* | 2/2011 | Lee et al. | 375/260 |
| 2012/0218906 A1 | 8/2012 | Lampinen et al. | |
| 2012/0250807 A1* | 10/2012 | Krishnan et al. | 375/343 |
| 2014/0192847 A1* | 7/2014 | Afkhami et al. | 375/219 |
| 2014/0192851 A1 | 7/2014 | Tahir et al. | |
| 2014/0195637 A1 | 7/2014 | Tahir et al. | |

FOREIGN PATENT DOCUMENTS

| | | |
|---|---|---|
| WO | 2014110275 | 7/2014 |
| WO | 2014110375 | 7/2014 |

OTHER PUBLICATIONS

HomePlug Powerline Alliance Inc., "HomePlug AV White Paper," Doc. Ver. Number HPAVWP-050818, Aug. 2005, pp. 1-11.

"International Application No. PCT/US2014/011050 International Search Report and Written Opinion", May 19, 2014, 14 pages.

"U.S. Appl. No. 13/738,594 Office Action", Jun. 16, 2014, 26 pages.

Akyildiz, et al., "Next generation/dynamic spectrum access/cognitive radio wireless networks: A survey", Computer Networks, Elsevier Science Publishers B.V., Amsterdam, NL, vol. 50, No. 13, Sep. 15, 2006, 2127-2159.

Niyato, et al., "IEEE 802.16/WiMAX-based broadband wireless access and its application for telemedicine/e-health services", IEEE Wireless Communications, IEEE Service Center, Piscataway. NJ. US. vol. 14. No. 1., Feb. 1, 2007, 72-83.

Co-Pending U.S. Appl. No. 13/738,594, filed Jan. 10, 2013, 33 pages.
Co-Pending U.S. Appl. No. 13/738,607, filed Jan. 10, 2013, 40 pages.
Co-Pending U.S. Appl. No. 13/738,612, filed Jan. 10, 2013, 53 pages.

* cited by examiner

RATE ADAPTATION FOR DATA COMMUNICATION

BACKGROUND

Embodiments of the inventive subject matter generally relate to the field of communications, and, more particularly, to rate adaptation for data communication.

Different types and levels of noise can be introduced in data communications along different media (e.g., Powerline Communications (PLC), Ethernet, wireless, etc.). This noise can be measured by a receiver that is receiving the data communications. For example, the receiver can measure the Signal-To-Noise Ratio (SNR) of the data communications. This SNR information can be used to dynamically adjust the parameters for data communications by track changing channel conditions for the particular media.

SUMMARY

In some embodiments, a method includes receiving, at a receiver of a first device via a channel of a communication medium, multiple data transmissions. Each data transmission of the multiple data transmissions has a guard interval of multiple guard intervals, wherein the multiple guard intervals have different lengths. The method includes determining, based on signal characteristics of the multiple data transmissions, the data transmission from among the multiple data transmissions having a preferred physical data rate. The method includes setting a length of an adjusted guard interval for the channel for data communication from a transmitter of a second device to the receiver of the first device via the communication medium, to a length of the guard interval for the data transmission having the preferred physical data rate.

In some embodiments, a method includes receiving, at a receiver of a first device via a channel of a communication medium, a data transmission having a number of symbols. Each guard interval of multiple guard intervals is associated with a different set of multiple sets of the number of symbols, wherein the multiple guard intervals have different lengths. The method includes determining, based on signal characteristics of the multiple sets of the number of symbols, the set from among the multiple sets having a preferred physical data rate. The method also includes setting a length of an adjusted guard interval of the channel for subsequent data transmissions from a transmitter of a second device to the receiver of the first device via the communication medium, to a length of the guard interval associated with the set of symbols having the preferred physical data rate.

In some embodiments, a method includes determining a delay spread of a multipath channel for data communication from a transmitter to a receiver via a communication medium. The method includes determining a noise level of the data transmission at the receiver. In response to the noise level being above a low noise threshold, the method includes setting a length of a guard interval for subsequent data transmissions from the transmitter to the receiver via the communication medium, based on the delay spread and the noise level at the receiver.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
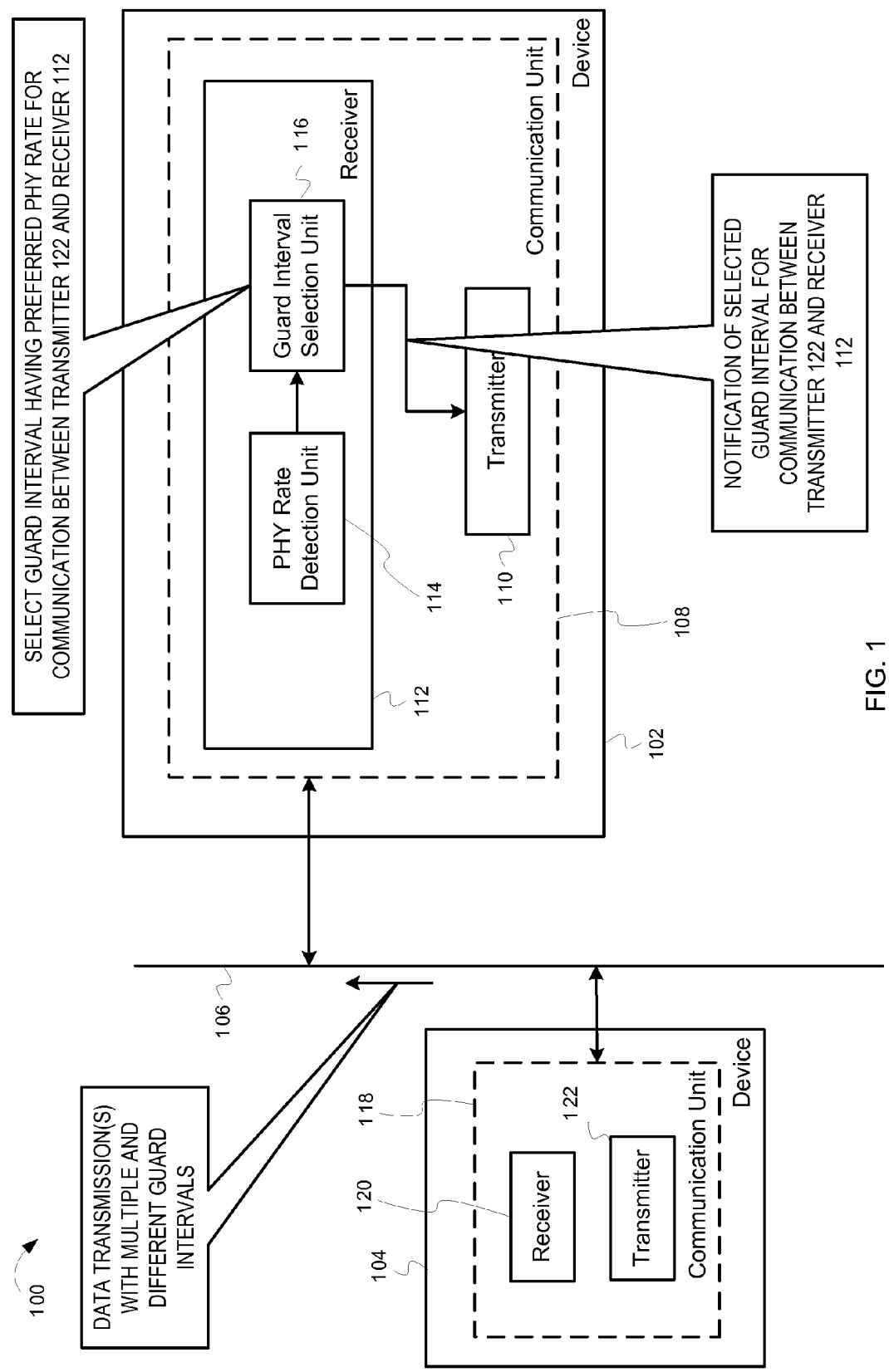
FIG. 1 depicts a block diagram of a system for guard interval selection based on a preferred PHY rate for data transmissions, according to some embodiments.

The description that follows includes exemplary systems, methods, techniques, instruction sequences and computer program products that embody techniques of the present inventive subject matter. However, it is understood that the described embodiments may be practiced without these specific details. For instance, although examples refer to Powerline Communications (PLC), some embodiments can be used in any other type of communication (e.g., Ethernet, wireless, etc.). Also, while described in reference to use in Orthogonal Frequency Division Multiplexing (OFDM)-based communications, some embodiments can be used on any other type of data communication. In other instances, well-known instruction instances, protocols, structures and techniques have not been shown in detail in order not to obfuscate the description.

Various embodiments adapt the data rate of data transmissions (rate adaptation) to account for detrimental effects of noise variability. For example, a transmitter can adjust transmission characteristics to attempt to increase or attempt to maximize the amount of data transferred with acceptable error. In some embodiments, rate adaptation can include an improved selection of guard interval lengths used in data transmissions. Guard intervals between data transmissions can be used to remove or reduce interference between data that is transmitted (i.e., intersymbol interference (ISI)). Intersymbol interference is typically a form of signal distortion where one symbol interferes with subsequent symbols in a data communication. Intersymbol interference can occur in a multipath channel where signals can arrive at a receiver through multiple paths in the communication media due to interference, refraction, reflection, etc.

To mitigate the effects of intersymbol interference, a guard interval can be placed at the end of a data transmission (e.g., packet) to avoid or reduce interference with the subsequent data transmission. In some embodiments, a length of the guard interval can be set relative to a defined maximum delay spread for the multipath channel. In an embodiment, a maximum delay spread for a channel can be defined as the difference between an arrival time of the earliest arriving signal and the arrival time of the latest arriving signal for a data communication in a multipath channel.

Some embodiments can incorporate an adaptive selection of guard interval lengths that can be specific to a channel and the changing conditions therein in the communications media. As further described below, some embodiments can select a guard interval that creates a preferred PHY rate for the data transmissions (which in some embodiments may be the highest attainable PHY rate with acceptable error or PHY rate above a specific threshold for, e.g., the type of data to be transmitted). Also as further described below, some embodiments can also select a guard interval based on a maximum delay spread relative to a noise level at a receiver that is receiving the data transmissions.

In some embodiments, rate adaptation can include optimal selection of the Forward Error Correction (FEC) code rate for the data transmission. FEC can reduce errors in data transmission over noisy channels. With FEC, the transmitter can redundantly encode the data transmissions. Using FEC, the transmitter can compute and add additional parity bits as part of the data transmissions. The receiver can then redundantly check the accuracy of the data transmissions based on the additional parity bits. However, as more parity bits are included in the data transmissions, the rate of the data transmissions is lowered. A code rate refers to the ratio of information bits to total transmitted bits. If there are N information bits and K parity bits, then the code rate can be N/(N+K). If the signal quality at the receiver is high, a low number of parity bits can be sufficient. Lowering the number of parity bits may increase the code rate, thus increasing transmission rates. If the signal quality at the receiver is low, the likelihood of bits being corrupted increases. Thus, the number of parity bits may be increased to create redundancies sufficient to offset such corruption. As further described below, some embodiments can select a code rate that creates a preferred PHY rate (e.g., a highest possible PHY rate) for the data transmissions. Some embodiments can also select a code rate based on the PHY rate and a variability of the channel noise of the data transmissions.

Accordingly, two approaches (guard interval selection and code rate selection) are described for rate adaptation for data transmissions. While described separately, in some embodiments, these two approaches can be practiced together.

Guard Interval Selection

This section describes various embodiments for guard interval selection. FIG. 1 depicts a block diagram of a system for guard interval selection based on a preferred PHY rate for data transmissions, according to some embodiments. In particular, FIG. 1 depicts a system 100 that includes a device 102 that is communicatively coupled to a device 104 through communication media 106. The communications between the devices 102 and 104 can be wired or wireless. For example, the communication media 106 can be a power line, air, coaxial cable, telephone line, etc. The devices 102 and 104 can be network devices (e.g., a personal computer (PC), a laptop, a netbook, a mobile phone, a personal digital assistant (PDA), or other electronic devices).

The device 104 can include a communication unit 118. The communication unit 118 can include a transmitter 122 and a receiver 120. The device 102 can include a communication unit 108. The communication unit 108 can include a transmitter 110 and a receiver 112. In this example, the transmitter 122 in the device 104 transmits data transmission(s) having multiple and different guard intervals to the receiver 112 in the device 102. The transmitter 122 can transmit these data transmissions at any point of operation of the system 100. For example, these data transmissions can be transmitted after the system is powered on or reset. These data transmissions can also be transmitted periodically as part of a periodic optimization of the system 100. This periodic optimization of the system 100 may be needed because characteristics of the system 100 can change over time. For example, if the system 100 is a PLC system, the characteristics (e.g., noise levels, noise variability, etc.) can change as more or less devices are plugged into the communication media 106 (e.g., the power line).

The data transmissions can be data packets (e.g., one or more streams of data packets). The different data packets can have different lengths of guard intervals. As further described below, in some embodiments, a same data transmission can include multiple and different guard intervals. For example, a first symbol(s) can have a first guard interval, a second symbol(s) can have a second guard interval, a third symbol(s) can have a third guard interval. The different guard intervals (first second and third guard intervals) in the same data transmission can have different lengths.

The receiver 112 can include a PHY rate detection unit 114 and a guard interval selection unit 116. The PHY rate detection unit 114 can determine a PHY data rate (e.g., bits/second) associated with the data transmissions (i.e., the data packets with symbols having different guard intervals or symbol(s) having the different guard interval lengths. In some embodiments, the PHY data rate can be estimated based on the Signal-To-Noise Ratios (SNRs). In one example, the data transmission having a highest SNR of the options is considered to have the preferred PHY data rate (which may be the highest PHY rate from the options). However, some embodiments can determine the PHY data rate based on other measures of the signal that provide the data transmissions or symbol(s). The PHY rate detection unit 114 can send an indication of the PHY data rates associated with the different data transmissions to the guard interval selection unit 116. The guard interval selection unit 116 can then select the guard interval utilized by the symbol(s) associated with the data transmission having a preferred PHY data rate.

The guard interval selection unit 116 can notify the transmitter 110 of the selected guard interval for communication between the transmitter 122 and the receiver 114. The transmitter 110 can then transmit a data transmission back to the receiver 120 that includes the selected guard interval. The transmitter 122 can then used the selected guard interval for subsequent data transmissions to the receiver 112. This selected guard interval can be for a particular channel on the communication media 106 that is used for communication from the transmitter 122 and the receiver 114. Accordingly, different channels for communication from the transmitter 122 and the receiver 114 can have different guard intervals. While described such that the selected guard interval is for a particular channel or between a particular transmitter and a particular receiver, in some embodiments, the selected guard interval can be used for other channels or other transmitter/receiver combinations. For example, the transmitter 110 can use the selected guard interval for communication along the communication media 106 to the receiver 120. Example operations of the system 100 are described in more detail below in reference to FIGS. 3-7.

Figure 2:
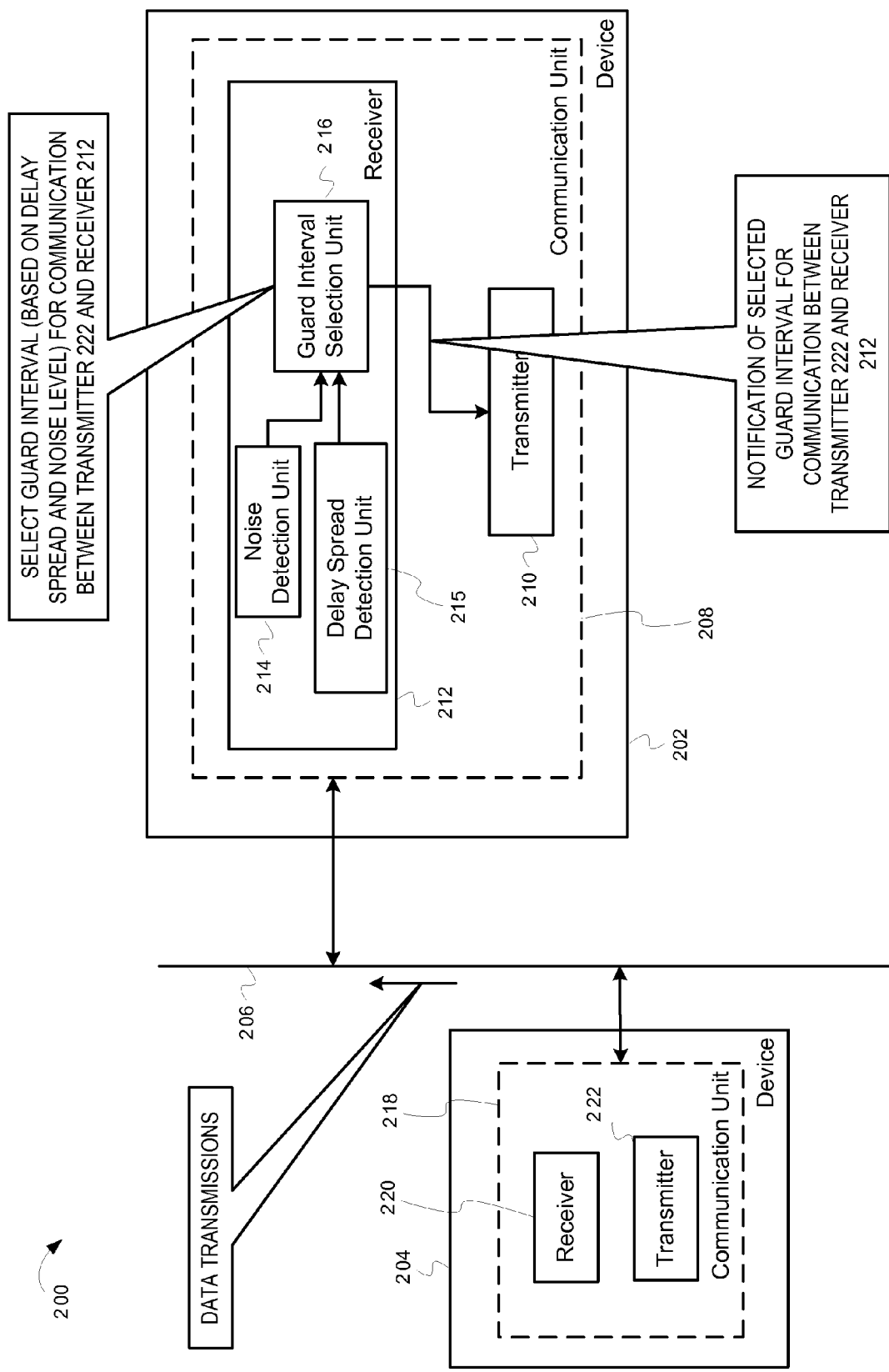
FIG. 2 depicts a block diagram of a system for guard interval selection based on a delay spread and noise level of a received signal, according to some embodiments.

FIG. 2 depicts a block diagram of a system for guard interval selection based on a delay spread and noise level of a received signal, according to some embodiments. In particular, FIG. 2 depicts a system 200 that has a similar network configuration to the system 100 of FIG. 1. The system 200 includes a device 202 that is communicatively coupled to a device 204 through communication media 206.

The device 204 can include a communication unit 218. The communication unit 218 can include a transmitter 222 and a receiver 220. The device 202 can include a communication unit 208. The communication unit 208 can include a transmitter 210 and a receiver 212. In this example, the transmitter 222 in the device 204 transmits data transmission(s) having multiple and different guard intervals to the receiver 212 in the device 202. The transmitter 222 can transmit these data transmissions at any point of operation of the system 200. Similar to the system 100, these data transmissions can be transmitted after the system is powered on or reset, periodically during regular operation, etc.

The receiver 212 can include a noise detection unit 214, a delay spread detection unit 215, and a guard interval selection unit 216. In some embodiments, the guard interval selection unit 216 can select the guard interval based on the delay spread and noise level at the receiver 212 for a particular channel. As described above, a delay spread can be defined as the difference between an arrival time of the earliest arriving signal and the arrival time of the latest arriving signal for a data transmission in a multipath channel. In a multipath signal, signals can arrive at the receiver 212 through multiple paths in the communication media 206 due to interference, refraction, reflection, etc. The delay spread detection unit 215 can then determine the delay spread for the channel based on a difference between an arrival time of the earliest arriving signal and the arrival time of the latest arriving signal for the data transmission. In some embodiments, the delay spread detection unit 215 can estimate the delay spread based on a time domain representation of the channel transfer function.

The noise detection unit 214 can determine a noise level at the receiver 212. In some embodiments, the noise detection unit 214 can determine the noise level by comparing a signal quality to a signal attenuation of a received signal. Alternatively, the noise detection unit 214 can determine the noise level by measuring the level of a received signal when it is known that no communications devices are actively transmitting signals. The guard interval selection unit 216 can receive the noise level from the noise detection unit 214 and the delay spread from the delay spread detection unit 215. Based on the noise level and the delay spread, the guard interval selection unit 216 can determine a selected guard interval.

For example, if the noise level is below a low noise threshold, the guard interval selection unit 216 can determine the guard interval just based on the delay spread (and essentially not consider the noise level). Examples of the low noise threshold can include a threshold where the noise level is lower than the level of signal and noise together by a certain factor (for example, noise level is less than 20% of the level of signal plus noise). In some embodiments, if the noise level is above a high noise threshold, the signal quality at the receiver 212 can be considered no longer dominated by the intersymbol interference which can be corrected based on a proper delay spread for the channel. Therefore, if the noise level is above the high noise threshold, the guard interval selection unit 216 can select a guard interval that is less than the delay spread. Examples of the high noise threshold can include a threshold where the noise level is higher than the level of signal and noise together by a certain factor (for example, noise level is greater than 50% of the level of signal plus noise). For example, the guard interval selection unit 216 can select a guard interval that is 80% of the delay spread, if the high noise threshold is exceeded.

In some embodiments, there can be multiple high noise thresholds where each one corresponds to a different guard interval that can be either determined as a percentage of the delay spread or as a fixed value. For example, if a first high noise threshold is exceeded, the guard interval selection unit 216 can select a guard interval that is a first fraction of the delay spread (e.g., 80%). If a second high noise threshold (higher than the first high noise threshold) is exceeded, the guard interval selection unit 216 can select a guard interval that is a second fraction of the delay spread (e.g., 70%) or fixed to a particular absolute length (e.g., 3 microseconds). The second fraction can be greater than the first fraction. If a third high noise threshold (higher than the second high noise threshold) is exceeded, the guard interval selection unit 216 can select a guard interval that is equal to a lower absolute length (e.g., 1 microsecond), etc.

The guard interval selection unit 216 can notify the transmitter 210 of the selected guard interval for communication between the transmitter 222 and the receiver 214. The transmitter 210 can then transmit a data transmission back to the receiver 220 that includes the selected guard interval. The transmitter 222 can then used the selected guard interval for subsequent data transmissions to the receiver 212. This selected guard interval can be for a particular channel on the communication media 206 that is used for communication from the transmitter 222 and the receiver 214. Accordingly, different channels for communication from the transmitter 222 and the receiver 214 can have different guard intervals. Example operations of the system 200 are described in more detail below in reference to FIG. 8.

Figure 3:
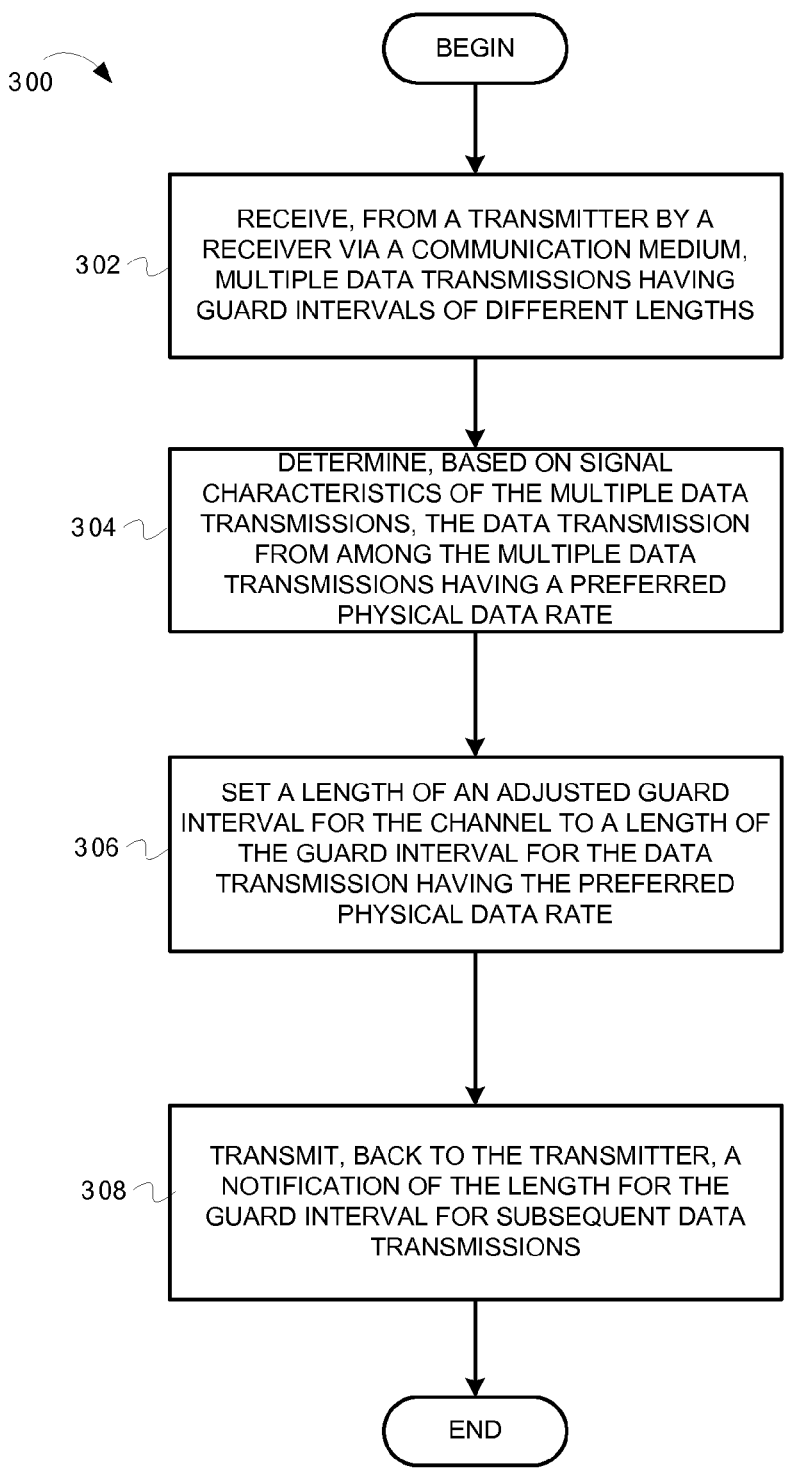
FIG. 3 depicts a flowchart for guard interval selection based on a preferred PHY rate for data transmissions, according to some embodiments.

FIG. 3 depicts a flowchart for guard interval selection based on a preferred PHY rate for data transmissions, according to some embodiments. The operations of a flowchart 300 are described in reference to FIG. 1 and FIGS. 4-5. The operations of the flowchart 300 begin at block 302 of FIG. 3.

Figure 4:
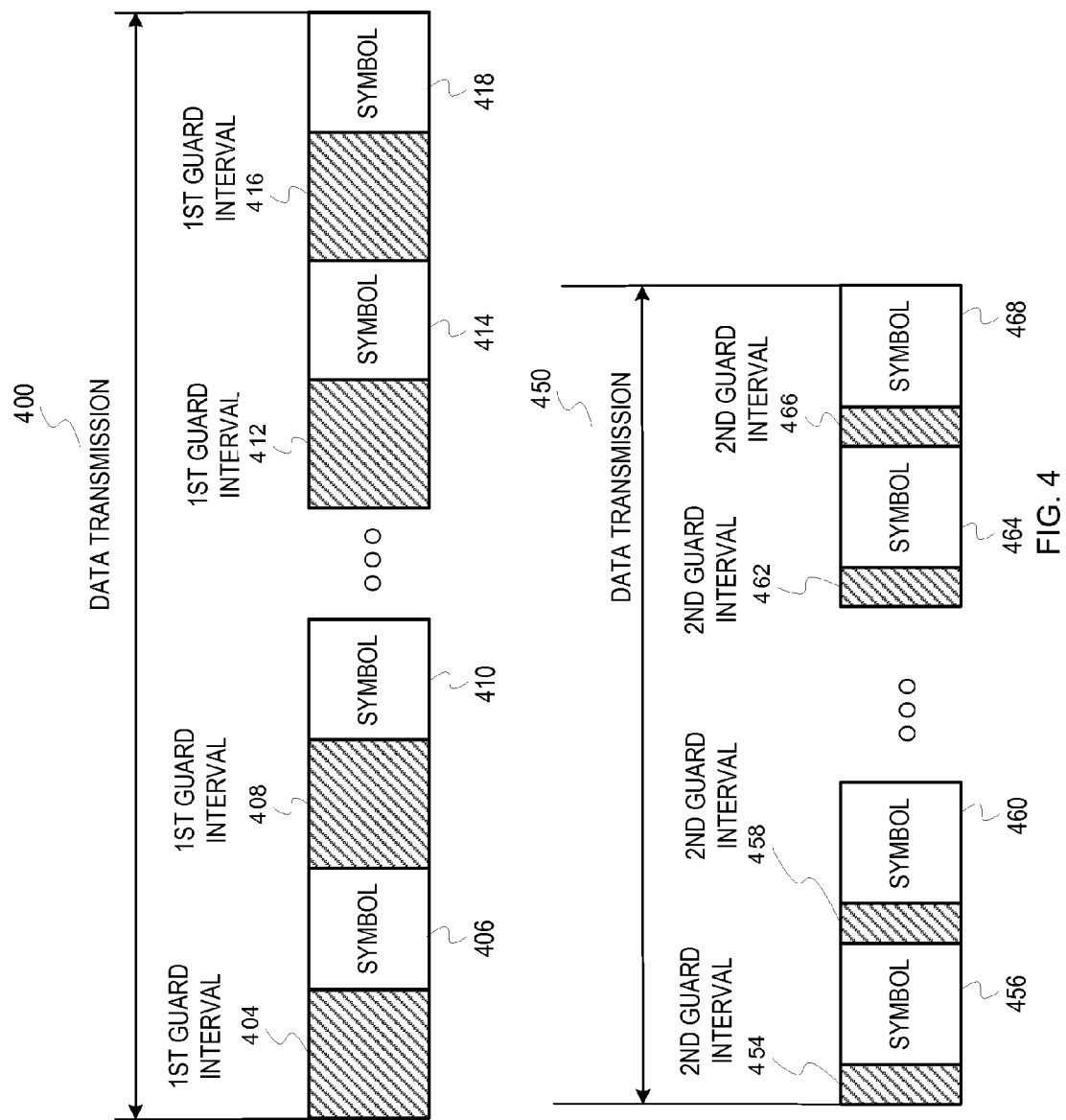
FIG. 4 depicts multiple data transmissions having different guard intervals used for guard interval selection, according to some embodiments.

At block 302, a receiver receives from a transmitter via communication media multiple data transmissions having guard intervals of different lengths. With reference to FIG. 1, the receiver 112 receives the multiple data transmissions from the transmitter 122 via the communication media 106. To illustrate, FIG. 4 depicts multiple data transmissions having different guard intervals used for guard interval selection, according to some embodiments. FIG. 4 depicts two data transmissions having two different guard intervals. In some embodiments, the data transmissions can be data packets. A first data transmission 400 includes symbols 406, 410, 414, and 418. The symbols 406, 410, 414, and 418 can include the payload of a data packet. Each symbol in the data transmission 400 can include a guard interval. In this example, the length of the guard intervals for the data transmission 400 is the same (first guard interval). Also in this example, the guard intervals are prepended to the associated symbol. In some embodiments, the guard intervals can be appended to the associated symbol. A first guard interval 404 is prepended to the symbol 406. A first guard interval 408 is prepended to the symbol 410. A first guard interval 412 is prepended to the symbol 414. A first guard interval 416 is prepended to the symbol 418.

A second data transmission 450 includes symbols 456, 458, 462, and 466. The symbols 456, 458, 462, and 466 can include the payload of a different data packet. Each symbol in the data transmission 450 can include a guard interval. In this example, the length of the guard intervals for the data transmission 450 is the same (second guard interval). A second guard interval 454 is prepended to the symbol 456. A second guard interval 458 is prepended to the symbol 460. A second guard interval 462 is prepended to the symbol 464. A second guard interval 466 is prepended to the symbol 468. A length of the guard intervals (first guard intervals) for the first data transmission 400 is different than a length of the guard intervals (second guard intervals) for the second data transmission 450. The transmitter 122 can transmit any number of data transmissions having guard intervals of different lengths. Returning to FIG. 3, after receiving the multiple data transmissions, operations of the flowchart 300 continue at block 304.

Figure 5:
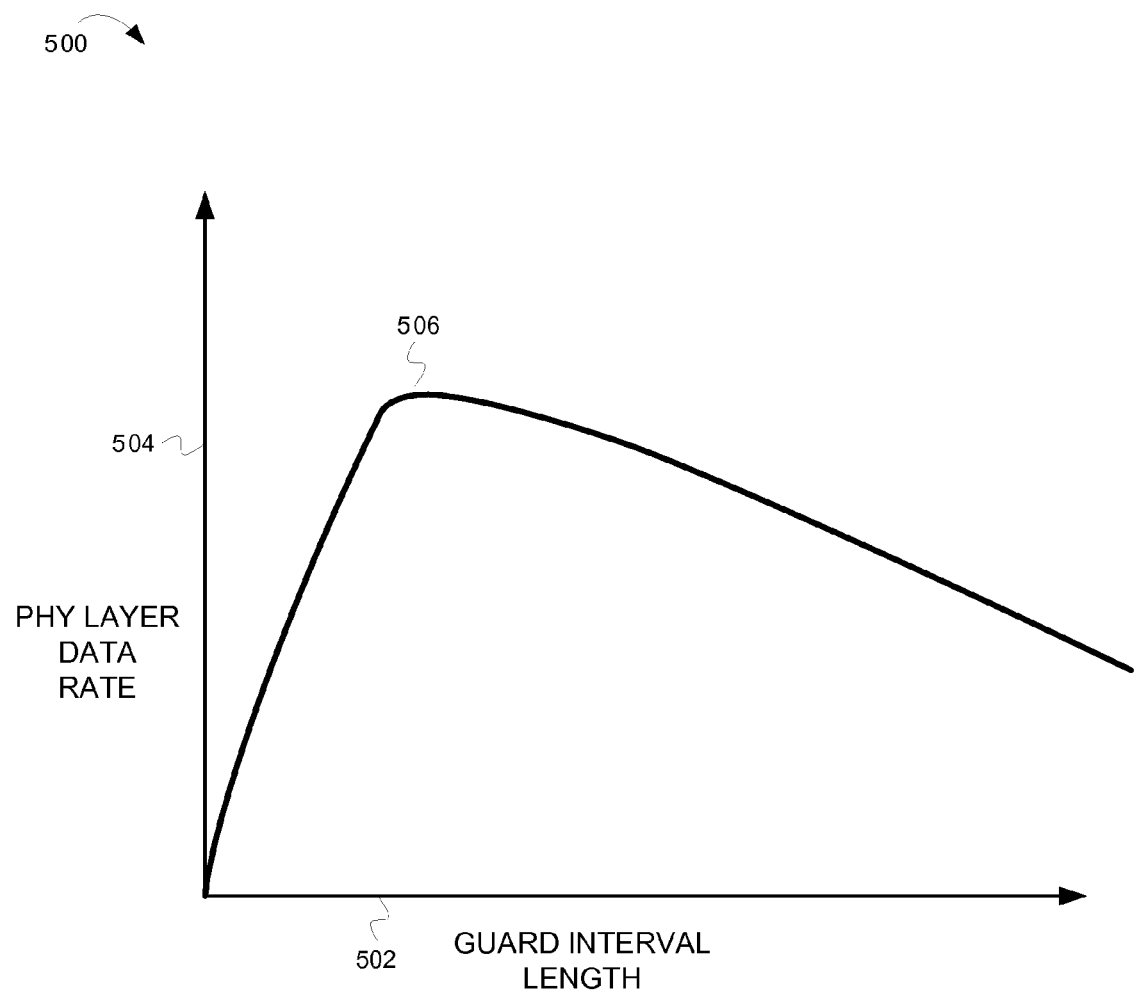
FIG. 5 depicts a graph of the PHY layer data rate v. the guard interval duration.

At block 304, the PHY rate detection unit 114 in the receiver 112 determines, based on signal characteristics of the multiple data transmissions, the data transmission from among the multiple data transmissions having a preferred PHY data rate (e.g., the highest PHY rate). To illustrate, FIG. 5 depicts a graph of the PHY layer data rate v. the guard interval duration. In particular, FIG. 5 depicts a graph 500 having an x-axis 502 that represents the guard interval length and a y-axis 504 that represents the PHY layer data rate. The graph 500 depicts a line showing a relationship between the PHY layer data rate and the guard interval length for a data transmission. A point 506 in the graph 500 is the point where there is a highest PHY layer data rate. Therefore, in an embodiment where the highest PHY rate is selected, the guard interval length at the point 506 would be selected to provide the highest PHY layer data rate. The graph 500 illustrates that a particular guard interval length produces the highest PHY data rate. The PHY rate detection unit 114 can estimate which data transmission has a higher PHY data rate compared to another by measuring the Signal-To-Noise (SNR) value of the signals that includes the data transmissions. The PHY rate detection unit 114 can either know the data to be received in the data transmission, or can estimate it from a noisy received signal. Based on either the a priori knowledge or the estimation, the PHY rate detection unit 114 can determine the SNR value of the signal that includes the data transmission. The PHY rate detection unit 114 can translate the SNR value into a PHY data rate (e.g., bits/second) for each of the data transmissions. The PHY rate detection unit 114 can then determine the data transmission having the preferred PHY rate among the data transmissions having the different guard interval lengths that were received. With reference to FIG. 4, the PHY rate detection unit 114 can determine a PHY data rate using the SNR values of the signals that represent the data transmission 400 and the data transmission 450. Operations of the flowchart 300 continue at block 306.

At block 306, the guard interval selection unit 116 set a length of an adjusted guard interval for the channel to a length of the guard interval for the data transmission having the preferred physical data rate. With reference to FIG. 1, the PHY rate detection unit 114 transmits an identification of the data transmission having a preferred PHY data rate to the guard interval selection unit 116. The guard interval selection unit 116 can then determine a length of the guard interval that has been appended to this data transmission having the preferred PHY data rate. Operations of the flowchart 300 continue at block 308.

At block 308, the transmitter 110 in the communication unit 108 transmits back to the transmitter 122 a notification of the length for the adjusted guard interval for subsequent data transmissions. With reference to FIG. 1, the guard interval selection unit 116 can transmit a notification of the selected guard interval to the transmitter 110. The transmitter 110 can then transmit notification of the selected guard interval back to the transmitter 122 via the communication media 106. The transmitter 122 can then use the selected guard interval for subsequent data transmissions for this particular channel to the receiver 112. There can be different channels in the communication media 106. In some embodiments, the operations of the flowchart 300 can be performed for the different channels. Accordingly, the operations for configuring of one channel can be independent of the operations for configuring of other channels in the communication media 106. Therefore, a length of the selected guard interval for one channel can be different than a length of the selected guard interval of other channels in the communication media 106. However in some embodiments, the selected guard interval can be used for other channels or other transmitter/receiver combinations. For example, the transmitter 110 can use the selected guard interval for communication along the communication media 106 to the receiver 120. Operations of the flowchart 300 are complete.

Figure 6:
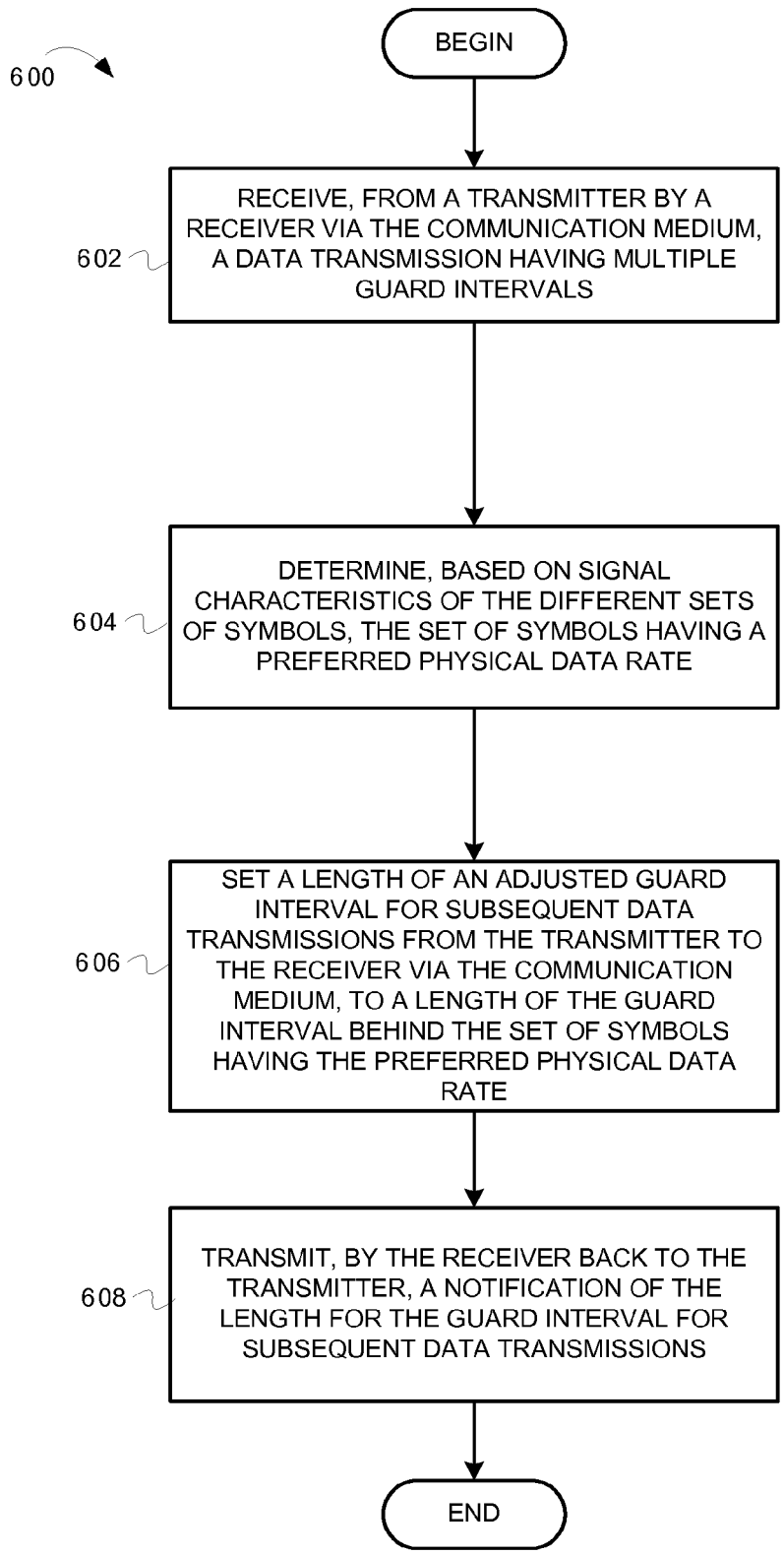
FIG. 6 depicts a flowchart for guard interval selection based on a preferred PHY rate for data transmissions, according to some embodiments.

FIG. 6 depicts a flowchart for guard interval selection based on a preferred PHY rate for data transmissions, according to some embodiments. In particular, FIG. 6 depicts a flowchart for guard interval selection where a same data transmission that includes multiple guard intervals is used. This is in contrast to the operations of the flowchart 300 of FIG. 3, where multiple data transmissions are used (where each data transmission can have its own guard interval, as described above). The operations of a flowchart 600 are described in reference to FIG. 1 and FIG. 7. The operations of the flowchart 600 begin at block 602 of FIG. 6.

Figure 7:
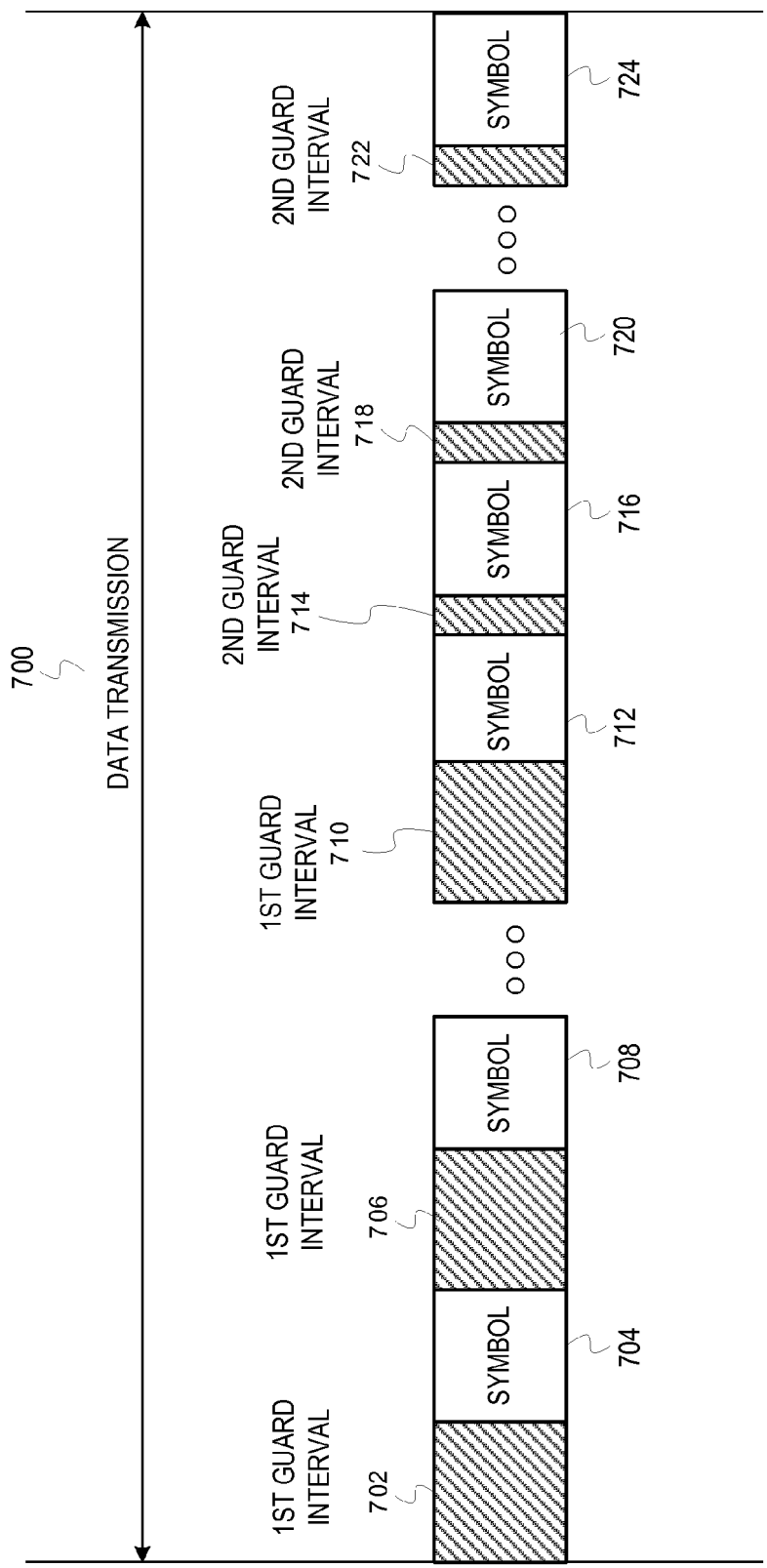
FIG. 7 depicts a same data transmission having different guard intervals for different symbol(s) used for guard interval selection, according to some embodiments.

At block 602, a receiver receives from a transmitter via a communication media, a data transmission having multiple guard intervals. In particular, the data transmission includes a number of symbols, where guard intervals of different lengths are associated with different symbol(s) in the data transmission. With reference to FIG. 1, the receiver 112 receives the data transmission from the transmitter 122 via the communication media 106. To illustrate, FIG. 7 depicts a same data transmission having different guard intervals for different symbol(s) used for guard interval selection, according to some embodiments. FIG. 7 depicts a data transmission 700. The data transmission 700 includes two different groups of symbols, where a different guard interval is used in each of the different group of symbols. The data transmission 700 includes a first group of symbols (symbols 704, 708, and 712) and a second group of symbols (symbols 716, 720, and 724), where each symbol is prepended with a guard interval. A first guard interval 702 is prepended to the symbol 704. A first guard interval 706 is prepended to the symbol 708. A first guard interval 710 is prepended to the symbol 712. In this example, the first guard intervals 702, 706, and 710 have a same length. A second guard interval 714 is prepended to the symbol 716. A second guard interval 718 is prepended to the symbol 720. A second guard interval 722 is prepended to the symbol 724. In this example, the second guard intervals 714, 718, and 722 have a same length.

A length of the first guard intervals 702, 706, and 710 for the first group of symbols is different than a length of the second guard intervals 714, 718, and 722 for the second group of symbols. While illustrated with two guard intervals, some embodiments can have a same data transmission with more than two. Also, while illustrated such that multiple symbols have a guard interval of a same length, in some embodiments, each symbol can have a guard interval of a different length. In some embodiments, the data transmission 700 can be a data packet. The symbols 704-712 and 716-724 can include the payload of a data packet. Also, when creating a data packet like the data transmission 700, the transmitter 122 can include information in the header of the packet that includes a length of the guard intervals for the symbols in the packet. Returning to FIG. 6, after receiving the data transmission, operations of the flowchart 600 continue at block 604.

At block 604, the PHY rate detection unit 114 in the receiver 112 determines, based on signal characteristics of the different sets of symbols, the set of symbols having a preferred physical data rate (e.g., a highest PHY data rate from the available options). Prior to receiving the transmission, the PHY rate detection unit 114 can be provided the format of the data transmission having the multiple guard intervals. This can include the grouping of the symbols and the location and size of the guard intervals. Based on this format, the PHY rate detection unit 114 can partition the data transmission into the groups of symbols along with the associated guard intervals. The PHY rate detection unit 114 can determine which group of symbols has a preferred PHY data rate. The PHY rate detection unit 114 can measure the Signal-To-Noise (SNR) value of the signal for each of the group of symbols. The PHY rate detection unit 114 can translate the SNR value into a PHY data rate (e.g., bits/second) for each of the groups of symbols. In an embodiment of determining a highest physical data rate, the PHY rate detection unit 114 can then determine the group of symbols having the preferred PHY rate among the group of symbols in the same data transmission. With reference to FIG. 7, the PHY rate detection unit 114 can determine a PHY data rate using the SNR values of the signals that represent the symbols 704-712 and the symbols 716-724. Operations of the flowchart 600 continue at block 606.

At block 606, the guard interval selection unit 116 set a length of an adjusted guard interval for the channel to a length of the guard interval for the data transmission having the preferred physical data rate. With reference to FIG. 1, the PHY rate detection unit 114 transmits an identification of the group of symbols having a preferred PHY data rate to the guard interval selection unit 116. The guard interval selection unit 116 can then determine a length of the guard interval that has been utilized with this group of symbols having the preferred PHY data rate. Operations of the flowchart 600 continue at block 608.

At block 608, the transmitter 110 in the communication unit 108 transmits back to device 104 (and subsequently the transmitter 122), a notification of the length for the adjusted guard interval for subsequent data transmissions. With reference to FIG. 1, the guard interval selection unit 116 can transmit a notification of the selected guard interval to the transmitter 110. The transmitter 110 can then transmit notification of the selected guard interval back to the device 104 via the communication media 106. The transmitter 122 can then use the selected guard interval for subsequent data transmissions for this particular channel to the receiver 112. There can be different channels in the communication media 106. In some embodiments, the operations of the flowchart 600 can be performed for the different channels. Accordingly, the operations for configuring of one channel can be independent of the operations for configuring of other channels in the communication media 106. Therefore, a length of the selected guard interval for one channel can be different than a length of the selected guard interval of other channels in the communication media 106. However in some embodiments, the selected guard interval can be used for other channels or other transmitter/receiver combinations. For example, the transmitter 110 can use the selected guard interval for communication along the communication media 106 to the receiver 120. Operations of the flowchart 600 are complete.

Figure 8:
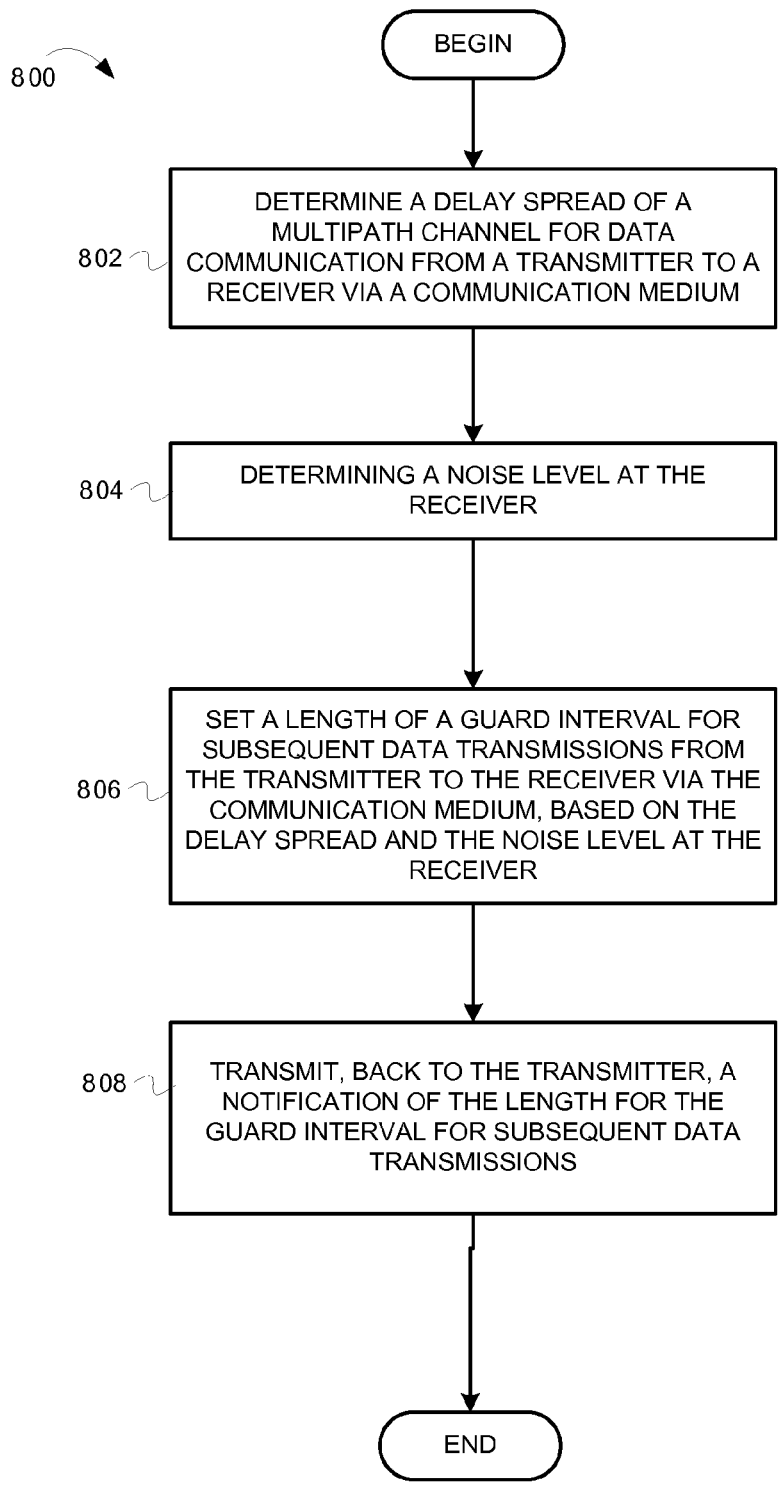
FIG. 8 depicts a flowchart for guard interval selection based on a delay spread and noise level of a received signal, according to some embodiments.

FIG. 8 depicts a flowchart for guard interval selection based on a delay spread and noise level of a received signal, according to some embodiments. The operations of a flowchart 800 are described in reference to FIG. 2. The operations of the flowchart 800 begin at block 802 of FIG. 8.

At block 802, the delay spread detection unit 215 in the receiver 212 (depicted in FIG. 2) determines a delay spread of a multipath channel for data communication between the transmitter 222 and the receiver 212 via the communication media 206. As described above a delay spread can be defined as the difference between an arrival time of the earliest arriving signal and the arrival time of the latest arriving signal for a data transmission in a multipath channel. In a multipath signal, signals can arrive at the receiver 212 through multiple paths in the communication media 206 due to interference, refraction, reflection, etc. Accordingly, the transmitter 222 can transmit a data transmission and wait until the latest arriving signal for the data transmission has arrived at the receiver 212 before transmitting a subsequent data transmission. The delay spread detection unit 215 can then determine the delay spread for the channel based on a difference between an arrival time of the earliest arriving signal and the arrival time of the latest arriving signal for the data transmission. In some embodiments, the delay spread detection unit 215 can estimate the delay spread based on a time domain representation of the channel transfer function. Operations of the flowchart 800 continue at block 804.

At block 804, the noise detection unit 214 in the receiver 212 determines a noise level at the receiver 212. In some embodiments, the noise detection unit 214 can determine the noise level by comparing a signal quality to a signal attenuation of a received signal. Alternatively, the noise detection unit 214 can determine the noise level by measuring the level of a received signal when it is known that no communications devices are actively transmitting signals. Operations of the flowchart 800 continue at block 806.

At block 806, the guard interval selection unit 216 in the receiver 212 sets a length of a guard interval based on the delay spread and the noise level at the receiver 212. The guard interval selection unit 216 can receive the noise level from the noise detection unit 214 and the delay spread from the delay spread detection unit 215. Based on the noise level and the delay spread, the guard interval selection unit 216 can determine a selected guard interval. As described above, if the noise level is below a low noise threshold, the guard interval selection unit 216 can determine the guard interval just based on the delay spread (and essentially not consider the noise level). In some embodiments, if the noise level is above a high noise threshold, the signal quality at the receiver 212 can be considered no longer dominated by the intersymbol interference which can be corrected based on a proper delay spread for the channel. Therefore, if the noise level is above the high noise threshold, the guard interval selection unit 216 can select a guard interval that is less than the delay spread. For example, the guard interval selection unit 216 can select a guard interval that is 80% of the delay spread, if the high noise threshold is exceeded. In some embodiments, there can be multiple high noise thresholds where each one corresponds to a different guard interval that can either be determined as a percentage of the delay spread or as a fixed value. For example, if a first high noise threshold is exceeded, the guard interval selection unit 216 can select a guard interval that is a first fraction of the delay spread (e.g., 80%). If a second high noise threshold (higher than the first high noise threshold) is exceeded, the guard interval selection unit 216 can select a guard interval that is a second fraction of the delay spread (e.g., 70%) fixed to a particular absolute length (e.g., 3 microseconds). The second fraction can be greater than the first fraction. If a third high noise threshold (higher than the second high noise threshold) is exceeded, the guard interval selection unit 216 can select a guard interval that is equal to a lower absolute length (e.g., 1 microsecond), etc. Operations of the flowchart 800 continue at block 808.

At block 808, the transmitter 210 in the communication unit 208 transmits back to the transmitter 222, a notification of the length for the adjusted guard interval for subsequent data transmissions. With reference to FIG. 2, the guard interval selection unit 216 can transmit a notification of the selected guard interval to the transmitter 210. The transmitter 210 can then transmit notification of the selected guard interval back to the device 204 (and subsequently the transmitter 222) via the communication media 206. The transmitter 222 can then use the selected guard interval for subsequent data transmissions for this particular channel to the receiver 212. Operations of the flowchart 800 are complete.

Code Rate Selection

Figure 9:
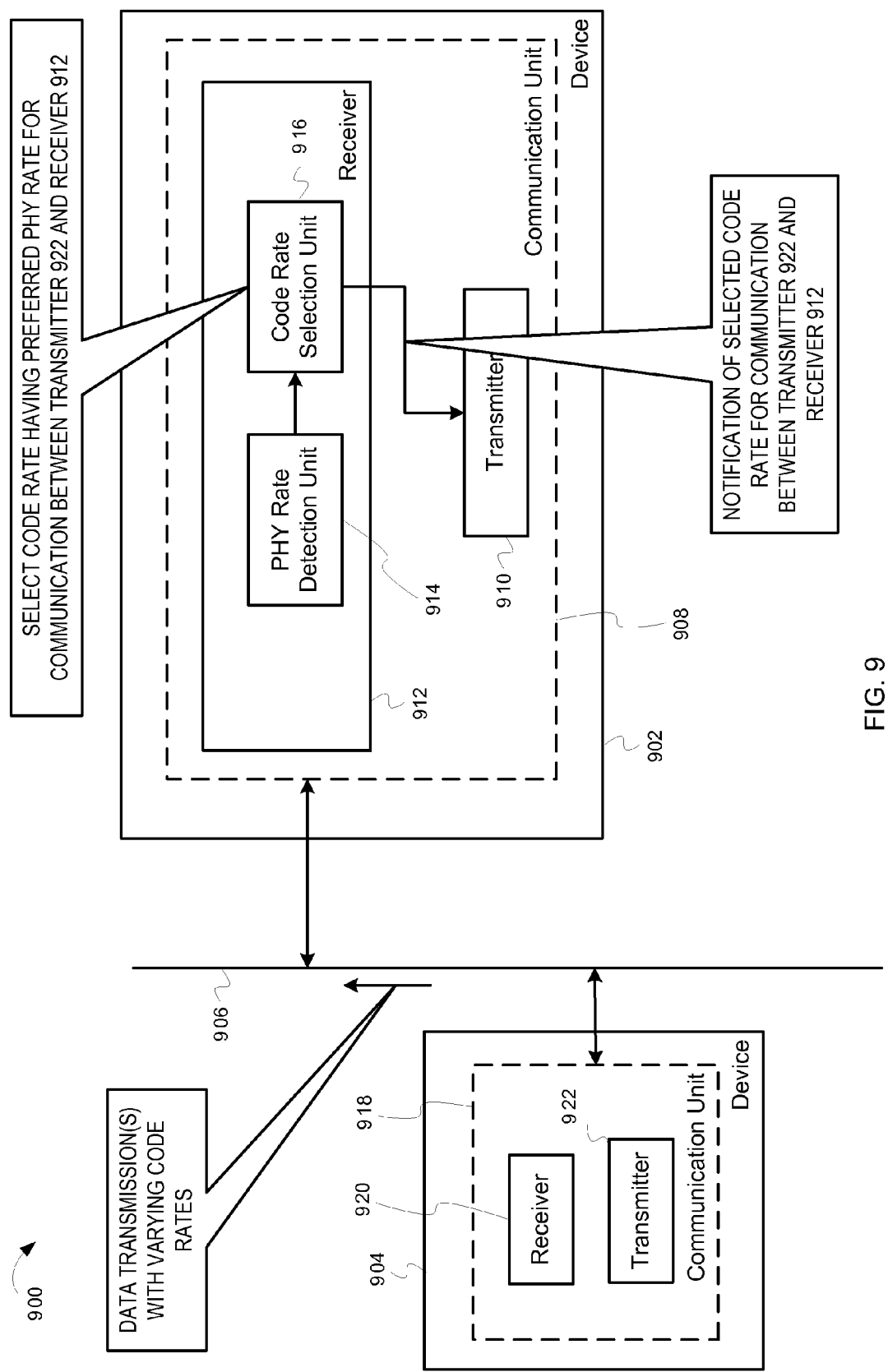
FIG. 9 depicts a block diagram of a system for code rate selection, according to some embodiments.

This section describes various embodiments for code rate selection. FIG. 9 depicts a block diagram of a system for code rate selection, according to some embodiments. In particular, FIG. 9 depicts a system 900 that has a similar network configuration to the system 100 of FIG. 1. The system 900 includes a device 902 that is communicatively coupled to a device 904 through communication media 906.

The device 904 can include a communication unit 918. The communication unit 918 can include a transmitter 922 and a receiver 920. The device 902 can include a communication unit 908. The communication unit 908 can include a transmitter 910 and a receiver 912. In this example, the transmitter 922 in the device 904 transmits data transmission(s) having varying code rates to the receiver 912 in the device 902. The transmitter 922 can transmit these data transmissions at any point of operation of the system 900. Similar to the system 100, these data transmissions can be transmitted after the system is powered on or reset, periodically during regular operation, etc.

The receiver 912 can include a PHY rate detection unit 914 and a code rate selection unit 916. The PHY rate detection unit 914 can determine a PHY data rate (e.g., bits/second) associated with the data transmissions having the different code rates. In some embodiments, the PHY data rate can be estimated based on the Signal-To-Noise Ratios (SNRs). For example, the data transmission having a highest SNR is considered to have a preferred PHY data rate. However, some embodiments can determine the PHY data rate based on other measures of the signal that provide the data transmissions or symbol(s). The PHY rate detection unit 914 can transmit the PHY data rates associated with the different data transmissions to the code rate selection unit 916. The code rate selection unit 916 can then select the code rate associated with the data transmission having a preferred PHY data rate.

The code rate selection unit 916 can notify the transmitter 910 of the selected code rate for communication between the transmitter 922 and the receiver 912. The transmitter 910 can then transmit a data transmission back to the receiver 920 that includes the selected code rate. The transmitter 922 can then used the selected code rate for subsequent data transmissions to the receiver 912. This selected code rate can be for a particular channel on the communication media 906 that is used for communication from the transmitter 922 and the receiver 912. Accordingly, different channels for communication from the transmitter 922 and the receiver 912 can have different code rate. While described such that the selected code rate is for a particular channel or between a particular transmitter and a particular receiver, in some embodiments, the selected code rate can be used for other channels or other transmitter/receiver combinations. For example, the transmitter 910 can use the selected code rate for communication along the communication media 906 to the receiver 920. Example operations of the system 900 are described in more detail below in reference to FIGS. 10-11.

Figure 10:
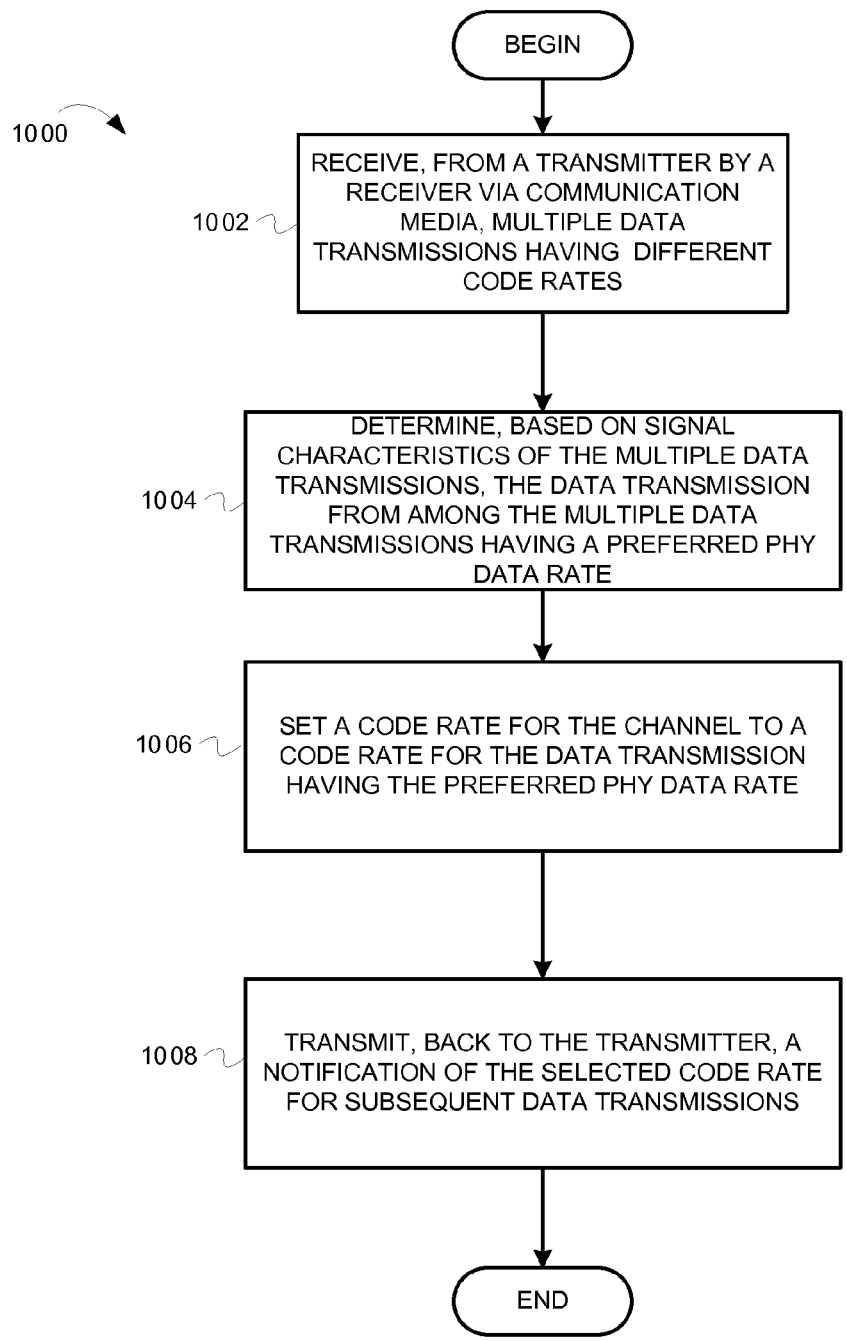
FIG. 10 depicts a flowchart for code rate selection, according to some embodiments.

FIG. 10 depicts a flowchart for code rate selection, according to some embodiments. The operations of a flowchart 1000 are described in reference to FIG. 9. The operations of the flowchart 1000 begin at block 1002 of FIG. 10.

At block 1002, a receiver receives from a transmitter via communication media, multiple data transmissions having different code rates. With reference to FIG. 9, the receiver 912 receives the multiple data transmissions from the transmitter 922 via the communication media 906. As described above, a code rate refers to the ratio of information bits to total transmitted bits. If there are N information bits and K parity bits, then the code rate can be N/(N+K). Accordingly, the transmitter 922 can transmit data transmissions having different parity bits relative to the information bits in order to vary the code rate. The data transmissions can include data packets, wherein each data transmission can be configured with a different code rate. The number of data transmissions that are transmitted can vary. For example, the transmitter 922 can transmit a separate data transmission for each possible code rate. In another example, the transmitter 922 can transmit N number of data packets with N different code rates that are considered to be the most likely to provide the best data rate for the given communication media. Operations of the flowchart 1000 continue at block 1004.

At block 1004, the PHY rate detection unit 914 in the receiver 912 determines, based on signal characteristics of the multiple data transmissions, the data transmission from among the multiple data transmissions having a preferred PHY data rate. In an embodiment of determining a highest PHY data rate, the PHY rate detection unit 914 can determine which data transmission has a preferred PHY data rate by measuring the Signal-To-Noise (SNR) value of the signal that includes the data transmission. The PHY rate detection unit 914 knows the data to be received in the data transmission. Based on knowing this data, the PHY rate detection unit 914 can determine the SNR value of the signal that includes the data transmission. The PHY rate detection unit 914 can translate the SNR value into a PHY data rate (e.g., bits/second) for each of the data transmissions. The PHY rate detection unit 914 can then determine the data transmission having the preferred PHY rate among the data transmissions having the different code rates that were received. Operations of the flowchart 1000 continue at block 1006.

At block 1006, the code rate selection unit 916 sets a code rate for the channel of the communication media to a code rate for the data transmission having the preferred physical data rate. With reference to FIG. 9, the PHY rate detection unit 914 can transmit pairs of a PHY rate and associated code rate to the code rate selection unit 916. The code rate selection unit 916 can then identify the code rate associated with the preferred PHY rate from among the different PHY rates provided by the PHY rate detection unit 916. This identified code rate can then be used for data transmission. Operations of the flowchart 1000 continue at block 1008.

At block 1008, the transmitter 910 in the communication unit 908 transmits back to the device 904, a notification of the code rate for subsequent data transmissions for this given channel. With reference to FIG. 9, the code rate selection unit 916 can send a notification of the selected code rate to the receiver 920. The transmitter 910 can then transmit notification of the selected code rate back to the device 904 via the communication media 906. The device 904 can then use the selected code rate for subsequent data transmissions for this particular channel to the receiver 912. There can be different channels in the communication media 906. In some embodiments, the operations of the flowchart 1000 can be performed for the different channels. Accordingly, the operations for configuring of one channel can be independent of the operations for configuring of other channels in the communication media 906. Therefore, a code rate for one channel can be different than a code rate of other channels in the communication media 106. However in some embodiments, the selected code rate can be used for other channels or other transmitter/receiver combinations. For example, the transmitter 910 can use the selected code rate for communication along the communication media 906 to the receiver 920. Operations of the flowchart 1000 are complete.

In some embodiments, the code rate can also be adjusted to account for noise variability. For example, the code rate can be adjusted upward or downward based on the amount of noise variability. Examples of such operations are described in reference to blocks 1216-1218 of FIG. 12 (which is described in more detail below).

Figure 11:
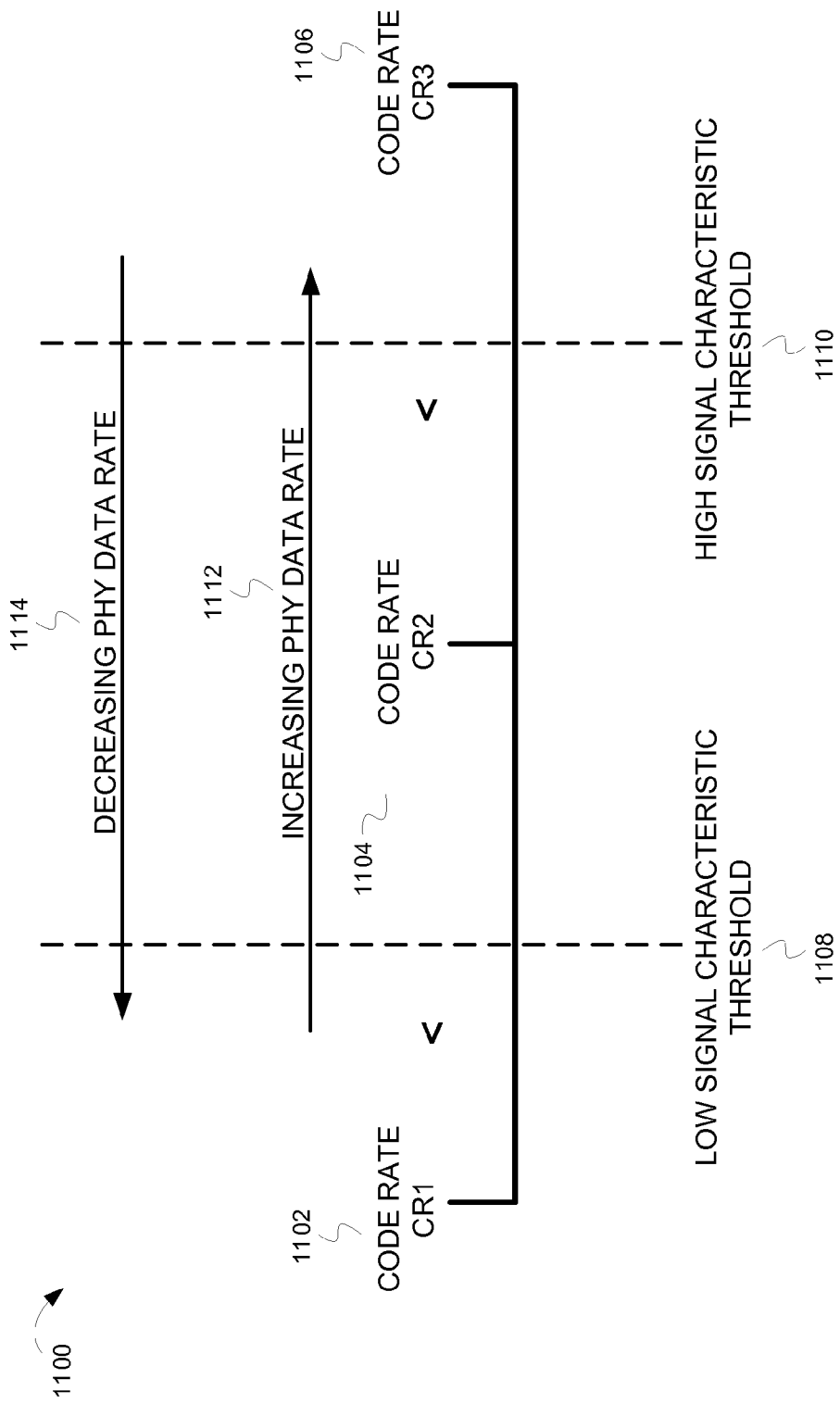
FIG. 11 depicts a graph for code rate selection, according to some embodiments.
Figure 12:
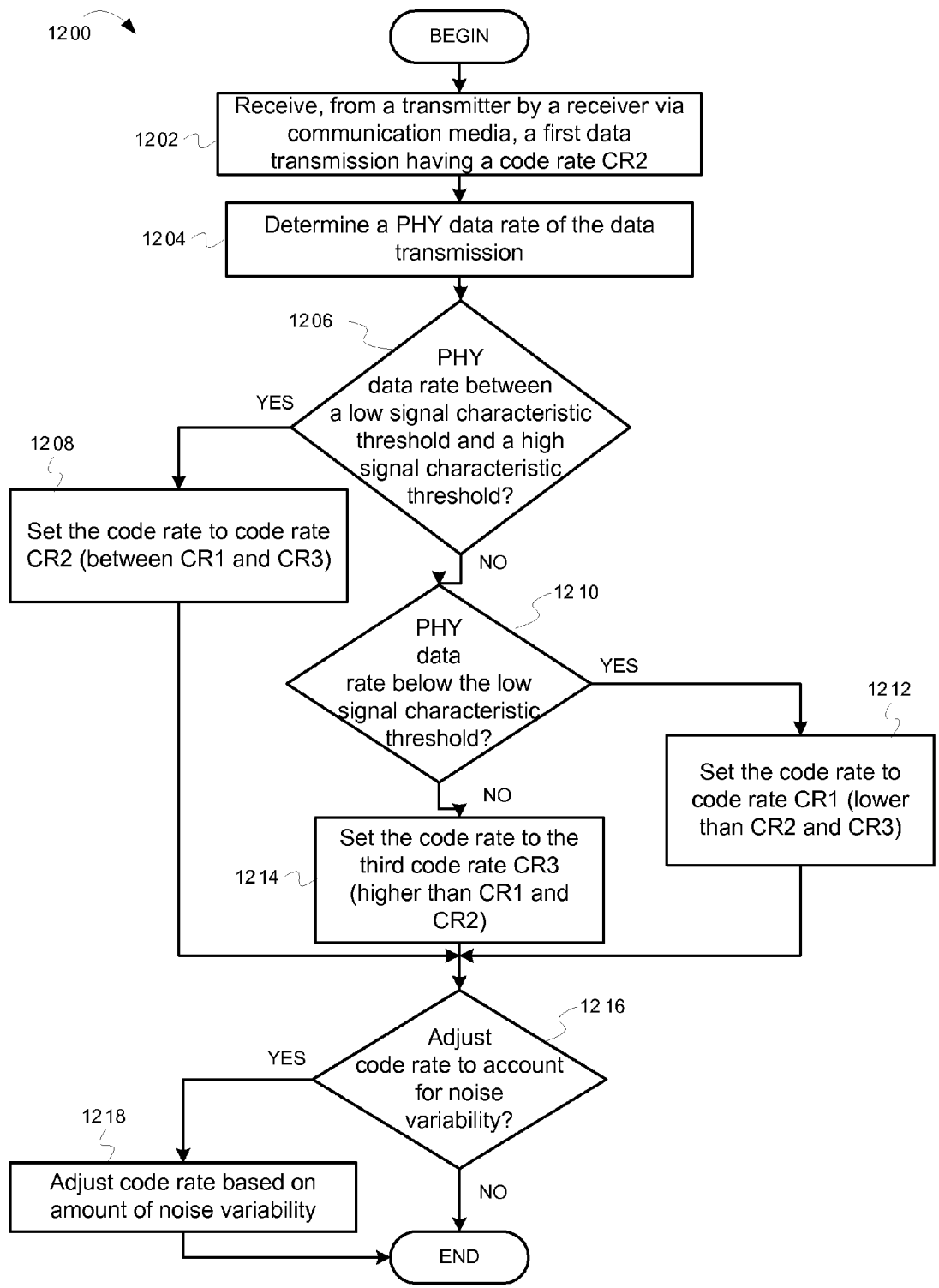
FIG. 12 depicts a flowchart for code rate selection using a low signal characteristic threshold based on the PHY data rate and a high signal characteristic threshold based on the PHY data rate, according to some embodiments

Another technique for code rate selection is now described in reference to FIGS. 11-12. For this code rate selection, the selected code rate can vary among three code rates based on the physical data rate. While described in reference to three code rates, some embodiments can include a greater or lesser number of code rates. The three code rates can be the code rates that are considered to be the most likely to provide the best PHY throughput for the given communication media. The PHY throughput can be defined as the PHY data rate measured after accounting for data transmission errors. For example, assume the PHY data rate is 100 Megabits/second and having an error rate of 50%. In this example, the PHY throughput would be 50 Megabits/second. A low PHY throughput can be a result of too many errors in the data transmission. In response, a lower code rate can be used to correct these errors based on the additional parity bits provided in the lower code rate in comparison to a higher one. However, a particular PHY data rate can also result in fewer than expected errors in the data transmission. In response, a higher code rate can be used because less parity bits may be required to correct for any errors that may be present. Accordingly, as the PHY data rate decreases, the code rate can be adjusted downward. Conversely, as the PHY data rate increases, the code rate can be adjusted upward.

FIG. 11 depicts a graph for code rate selection, according to some embodiments. A graph 1100 includes three different code rates among which the selected code rate can be set—a code rate CR1 1102, a code rate CR2 1104, and a code rate CR3 1106. The code rate CR1 1102 is less than the code rate CR2 1104, which is less than the code rate CR3 1106. The graph 1100 also includes a low signal characteristic threshold 1108 and a high signal characteristic threshold 1110. The low signal characteristic threshold 1108 is positioned between the code rate CR1 1102 and the code rate CR2 1104. The high signal characteristic threshold 1110 is positioned between the code rate CR2 1104 and the code rate CR3 1106. Both the low signal characteristic threshold and the high signal characteristic thresholds can be configurable values that can vary depending on the system, the type of communication media, the type of data, etc. An example of the low signal characteristic threshold can include a data signal characteristic threshold representative of a low order modulation on the medium (e.g., the low signal characteristic threshold could be given as the data rate that corresponds to an average of two bits modulated per carrier). Another example of the low signal characteristic threshold can be a threshold in the number of carrier frequencies that support low orders of modulation (e.g., the low signal characteristic threshold in an OFDM system could be determined as 75% of carriers supporting two bits per carrier or less). Another example of the low signal characteristic threshold can be an error rate threshold (e.g., the low signal characteristic threshold could be determined by an error rate of 10% of all transmissions or more). Furthermore, the low signal characteristic threshold can also be selected as a combination of thresholds as mentioned above. For example, the low signal characteristic threshold could be a combination of the three example thresholds above: 1) PHY rate representative of 2 bits modulated per carrier or less; 2) 75% of carriers supporting two bits or less; and/or 3) the error rate is 10% or more.

An example of the high signal characteristic threshold can include a data signal characteristic threshold representative of a high order modulation on the medium (e.g., the high signal characteristic threshold could be given as the data rate that corresponds to an average of eight bits modulated per carrier or more). Another example of the high signal characteristic threshold can be a threshold in the number of carrier frequencies that support high orders of modulation (e.g., the high signal characteristic threshold in an OFDM system could be determined as 75% of carriers supporting eight bits per carrier or more). Another example of the high signal characteristic threshold can be an error rate threshold (e.g., the high signal characteristic threshold could be determined by an error rate of 1% of all transmissions or less). Furthermore, the high signal characteristic threshold can also be selected as a combination of thresholds as mentioned above. For example, the high signal characteristic threshold could be a combination of the three example thresholds above: 1) PHY rate representative of eight bits modulated per carrier or more; 2) 75% of carriers supporting eight bits or more; and/or 3) the error rate is 1% or less.

The graph 1100 also depicts an increasing PHY data rate 1112 and a decreasing PHY data rate 1114. As further described in more detail below in reference to FIG. 12, as the PHY data rate increases, the code rate can increase. Conversely, as the PHY data rate decreases, the code rate can decrease. In this example, the selected code rate can switch among the code rate CR1 1102, the code rate CR2 1104, and the code rate CR3 1106, as the PHY data rate falls below the low signal characteristic threshold 1108 or rises above the high signal characteristic threshold 1110. In particular, if a current PHY data rate is below the low signal characteristic threshold 1108, the selected code rate can be set to the code rate CR1 1102. If the current PHY data rate is between the low signal characteristic threshold 1108 and the high signal characteristic threshold 1110, the selected code rate can be set to the code rate CR2 1104. If the current PHY data rate is above the high signal characteristic threshold 1110, the selected code rate can be set to the code rate CR3 1106.

To illustrate, FIG. 12 depicts a flowchart for code rate selection using a low signal characteristic threshold based on the PHY data rate and a high signal characteristic threshold based on the PHY data rate, according to some embodiments. The operations of a flowchart 1200 are described in reference to FIGS. 9 and 11. In the operations of the flowchart 1200, the selected code rate can vary among three code rates based on the physical data rate. A more detailed description of the flowchart 1200 is now described and begins at block 1202.

At block 1202, a receiver receives from a transmitter via communication media, a first data rate transmission having a first code rate. For example, the first code rate can be the code rate between the other two code rates (i.e., between the highest code rate and the lowest code rate). With reference to FIG. 11, the code rate can be set to code rate CR2 1104. With reference to FIG. 9, the receiver 912 receives the data transmission having the code rate CR2 1104 from the transmitter 922 via the communication media 906. Operations of the flowchart 1200 continue at block 1204.

At block 1204, the PHY rate detection unit 914 in the receiver 912 determines, based on a signal quality level of the data transmission, the PHY data rate of the data transmission. The PHY rate detection unit 914 can determine the PHY data rate by measuring the Signal-To-Noise (SNR) value of the signal that includes the data transmission. The PHY rate detection unit 914 knows the data to be received in the data transmission. Based on knowing this data, the PHY rate detection unit 914 can determine the SNR value of the signal that includes the data transmission. The PHY rate detection unit 914 can translate the SNR value into a PHY data rate (e.g., bits/second) for the data transmission. Operations of the flowchart 1200 continue at block 1206.

At block 1206, the code rate selection unit 916 determines whether the PHY data rate of the data transmission is between a low signal characteristic threshold and a high signal characteristic threshold. With reference to FIG. 11, the code rate selection unit 916 determines whether the PHY data rate of the data transmission is between the low signal characteristic threshold 1108 and the high signal characteristic threshold 1110. If the PHY data rate is between the low signal characteristic threshold 1108 and the high signal characteristic threshold 1110, operations of the flowchart 1200 continue at block 1208. Otherwise, operations of the flowchart 1200 continue at block 1210.

At block 1208, the code rate selection unit 916 sets the code rate to the code rate CR2 (between the code rate CR1 and the code rate CR3). With reference to FIG. 11, the code rate selection unit 916 sets the code rate to the code rate CR2 1104 because the PHY data rate is greater than the low signal characteristic threshold 1108 and less than the high signal characteristic threshold 1110. Operations of the flowchart 1200 continue at block 1216, which is further described below.

At block 1210, the code rate selection unit 916 determines whether the PHY data rate of the data transmission is below the low signal characteristic threshold. With reference to FIG. 11, the code rate selection unit 916 determines whether the PHY data rate of the data transmission is below the low signal characteristic threshold 1108. If the PHY data rate is below the low signal characteristic threshold 1108, operations of the flowchart 1200 continue at block 1212. Otherwise, operations of the flowchart 1200 continue at block 1214.

At block 1212, the code rate selection unit 916 sets the code rate to the code rate CR1 (the lowest code rate). With reference to FIG. 11, the code rate selection unit 916 sets the code rate to the code rate CR1 1102 because the PHY data rate has fallen below the low signal characteristic threshold 1108. Operations of the flowchart 1200 continue at block 1216, which is further described below.

At block 1214, the code rate selection unit 916 sets the code rate to the code rate CR3 (the highest code rate). In particular, because the PHY data rate was determined to not be between the low signal characteristic threshold and the high signal characteristic threshold (at block 1206) and the PHY rate was determined to not be below the low signal characteristic threshold (at block 1210), the code rate selection unit 916 can assume that the PHY data rate is above the high rate threshold. With reference to FIG. 11, the code rate selection unit 916 sets the code rate to the code rate CR3 1106 because the PHY data rate is above the high rate threshold 1110. Operations of the flowchart 1200 continue at block 1216.

At block 1216, the code rate selection unit 916 determines whether to adjust the selected code rate to account for noise variability. If a channel is considered to have high noise variability, it can be difficult to set a code rate to reduce errors caused by noise because the noise levels can vary greatly. Accordingly, to account for possibly large changes in the noise level, a lower code rate with additional parity bits can be used to reduce errors when the noise levels quickly increase (due to high noise variability). In other words, if the behavior of the channel is fairly precise, the behavior of the channel can be closely estimated while still maintaining a low error rate. However, if the behavior of the channel is more erratic, the noise can happen unpredictably. Accordingly, the code rate can be set to a lower code rate (with more parity bits) that provides more resilience to account for these unpredictable noise events. In some embodiments, the code rate selection unit 916 can determine if the noise variability exceeds a noise variability threshold in order to adjust the selected code rate.

A noise variability threshold can be derived based on the PHY data rate estimates obtained for data transmissions over time. In some embodiments, the noise variability threshold can be derived based on the error rates incurred in data transmissions over time. In some embodiments, the channel noise can be monitored directly (in the absence of data transmissions). The noise level threshold can then be derived based on noise level measurements. If the noise variability is measured through PHY data rate estimates, the noise variability threshold can be a limit on the amount of variation allowed in PHY data rate estimates. For example, a noise variability threshold can be deemed to be exceeded if the average difference between PHY data rate estimates and the average PHY data rate estimate exceeds 20%. Similarly, a noise variability threshold can be defined as a limit on the variability in error rates observed over time, or it can be defined as a limit on noise power variation as measured over a period of time. If the code rate is not to be adjusted to account for the noise variability, operations of the flowchart 1200 are complete. Otherwise, operations of the flowchart 1200 continue at block 1218.

At block 1218, the code rate selection unit 916 adjusts the code rate based on the amount of noise variability. In particular, the greater the noise variability, the more the code rate selection unit 916 can lower the code rate. For example, if the amount of noise variability exceeds a first level, the code rate selection unit 916 can lower the code rate a first amount. If the amount of noise variability exceeds a second, greater level, the code rate selection unit 916 can lower the code rate a second, greater amount. For example, assume the selected code rate is set to the code rate CR3 and assume that the noise variability of the channel exceeds a first level. In response, the code rate selection unit 916 can change the selected code rate from the code rate CR3 to the code rate CR2. In another example, assume the selected code rate is again set to the code rate CR3 and assume that the noise variability of the channel exceeds a second, greater level. In response, the code rate selection unit 916 can change the selected code rate from the code rate CR3 to the code rate CR1. Operations of the flowchart 1200 are complete.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 13:
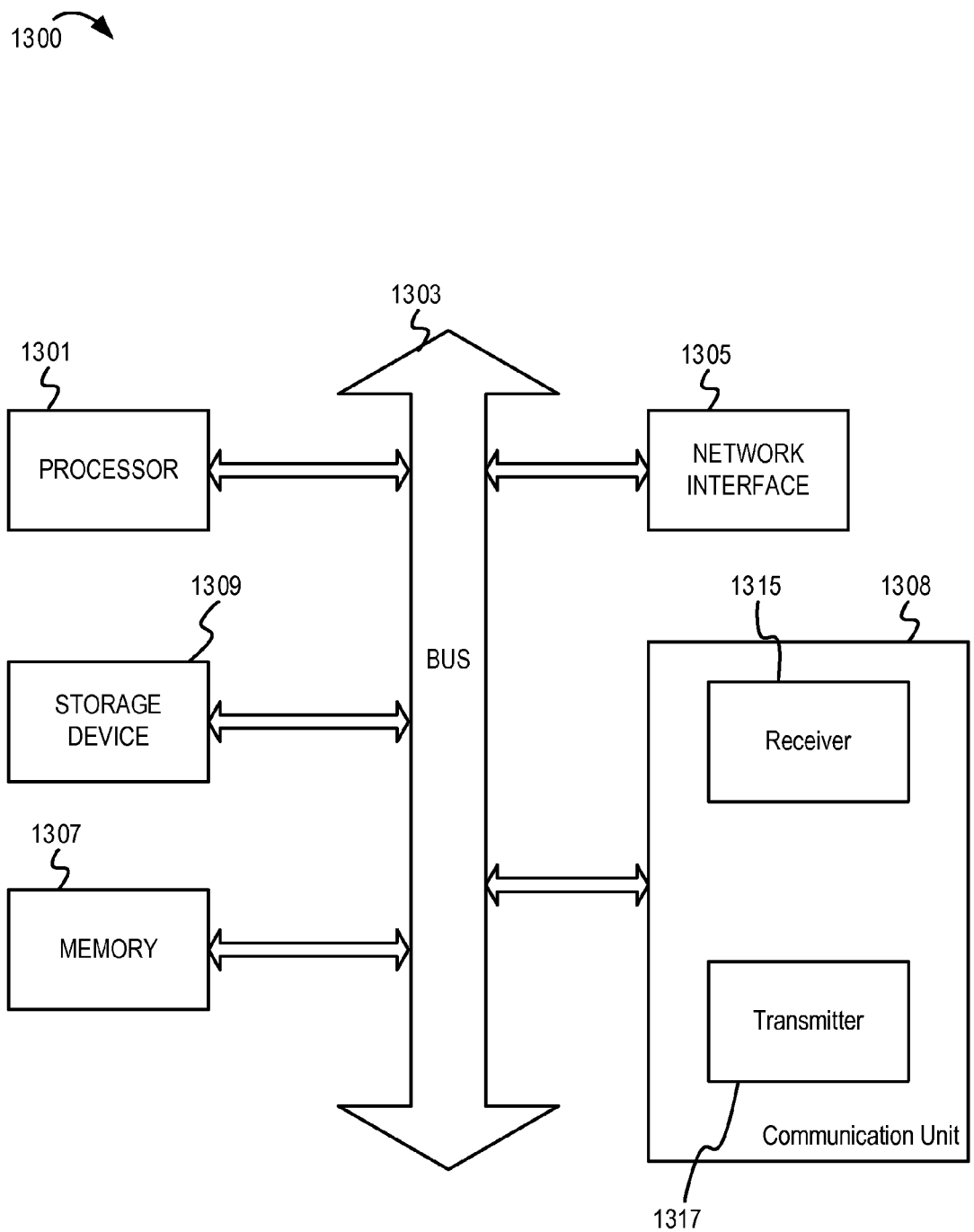
FIG. 13 depicts a block diagram of a device for guard interval selection and/or code rate selection, according to some embodiments.

FIG. 13 depicts a block diagram of a device for guard interval selection and/or code rate selection, according to some embodiments. In some embodiments, a device 1300 can be an electronic device (e.g., a personal computer (PC), a laptop, a netbook, a mobile phone, a personal digital assistant (PDA), or other electronic system). In other embodiments, the device 1300 can be a subsystem embedded in another electronic device (e.g., a personal computer (PC), a laptop, a netbook, a mobile phone, a personal digital assistant (PDA), or other electronic system).

The device 1300 includes a processor 1301 (possibly including multiple processors, multiple cores, multiple nodes, and/or implementing multi-threading, etc.). The device 1300 includes memory 1307. The memory 1307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The device 1300 also includes a bus 1303 (e.g., PCI, ISA, PCI-Express, HyperTransport®, Infini-Band®, NuBus, etc.), a network interface 1305 (e.g., an ATM interface, an Ethernet interface, a Frame Relay interface, SONET interface, wireless interface, etc.), and a storage device(s) 1309 (e.g., optical storage, magnetic storage, etc.).

The device 1300 also includes a communication unit 1308 that includes a receiver 1315 and a transmitter 1317. The receiver 1315 and the transmitter 1317 can perform operations for rate adaptation, as described above with reference to FIGS. 1-12. Any of the functionality in the communication unit 1308 may be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13 (e.g., video cards, audio cards, additional network interfaces, peripheral devices, etc.). The processor 1301, the storage device 1309, the memory 1307, and the network interface 1305 are coupled to the bus 1303. Although illustrated as being coupled to the bus 1303, the memory 1307 may be coupled to the processor 1301.

While the embodiments are described with reference to various implementations and exploitations, it will be understood that these embodiments are illustrative and that the scope of the inventive subject matter is not limited to them. In general, techniques for rate adaptation for data communication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for data communication comprising:
receiving, at a receiver of a first device via a channel of a communication medium, multiple data transmissions;
determining, based at least in part on noise variability in the multiple data transmissions, a data transmission from among the multiple data transmissions having a preferred physical data rate;
determining, by the first device, a length of a guard interval for the channel for subsequent data transmissions from a transmitter of a second device to the receiver of the first device via the communication medium, based at least in part on a length of a guard interval of the data transmission having the preferred physical data rate; and
determining, by the receiver of the first device, a noise variability of the data transmission having the preferred physical data rate; and
determining to adjust the length of the guard interval to a first fraction of the guard interval, in response to the noise variability being above a first high noise variability threshold.

2. The method of claim 1, wherein determining the length of the guard interval for the channel is performed independent of determining a length of a guard interval of other channels in the communication medium.

3. The method of claim 2, wherein the length of the guard interval for the channel is different than a length of a guard interval of at least one other channel in the communication medium.

4. The method of claim 1, wherein the multiple data transmissions comprise data packets.

5. The method of claim 1, wherein the communication medium comprises a power line.

6. The method of claim 1, further comprising providing, by the first device to the second device, an indication of the length for the guard interval for the subsequent data transmissions.

7. The method of claim 1, further comprising:
determining to adjust the length of the guard interval to a second fraction of the guard interval, in response to the noise variability being above a second high noise variability threshold that is greater than the first high noise variability threshold, wherein the second fraction is greater than the first fraction.

8. The method of claim 1, wherein the preferred physical data rate comprises a highest physical data rate.

9. A method for data communication comprising:
receiving, at a receiver of a first device via a channel of a communication medium, a data transmission having a first plurality of symbols and a second plurality of symbols, the first plurality of symbols having guard intervals of a first length and the second plurality of symbols having guard intervals of a second length;
determining, based at least in part on noise variability in the first plurality of symbols and the second plurality of symbols, that the first plurality of symbols have a preferred physical data rate;
determining, by the first device, a length of a guard interval for the channel for subsequent data transmissions from a transmitter of a second device to the receiver of the first device via the communication medium, based at least in part on the first length of the guard intervals associated with the first plurality of symbols having the preferred physical data rate;
determining, by the receiver of the first device, a noise variability of the first plurality of symbols having the preferred physical data rate; and
determining to adjust the length of the guard interval to a first fraction of the guard interval, in response to the noise variability being above a first high noise variability threshold.

10. The method of claim 9, wherein determining the length of the guard interval for the channel is performed independent of determining a length of a guard interval for other channels in the communication medium.

11. The method of claim 10, wherein the length of the guard interval for the channel is different than a length of a guard interval of at least one other channel in the communication medium.

12. The method of claim 9, further comprising providing, by the first device to the second device, an indication of the length for the guard interval for the subsequent data transmissions.

13. The method of claim 9, further comprising:
determining to adjust the length of the guard interval to a second fraction of the guard interval, in response to the noise variability being above a second high noise variability threshold that is greater than the first high noise variability threshold, wherein the second fraction is greater than the first fraction.

14. The method of claim 9, wherein the preferred physical data rate comprises a highest physical data rate.

15. A method for data communication comprising:
determining, at a first device, a delay spread of a multipath channel for a data transmission from a transmitter of a second device to a receiver of the first device via a communication medium;
determining a noise level of the data transmission;
in response to the noise level being above a low noise threshold, determining, by the first device, a length of a guard interval for subsequent data transmissions from the transmitter of the second device to the receiver of the first device, based at least in part on the delay spread and the noise level;
determining, by the receiver of the first device, a noise variability of the data transmission; and
determining to adjust the length of the guard interval to a first fraction of the delay spread, in response to the noise variability of the data transmission being above a first high noise variability threshold.

16. The method of claim 15, further comprising:
in response to the noise level being below the low noise threshold, determining, by the first device, the length of the guard interval based at least in part on the delay spread and independent of the noise level.

17. The method of claim 15, further comprising:
determining to adjust the length of the guard interval to a second fraction of the delay spread, in response to the noise variability being above a second high noise variability threshold that is greater than the first high noise variability threshold, wherein the second fraction is greater than the first fraction.

18. The method of claim 15, further comprising providing, to the transmitter, an indication of the length for the guard interval for the subsequent data transmissions.

19. A first device for data communication comprising:
a network interface to receive, from a transmitter of a second device via a channel in a communication medium, a data transmission having a first plurality of symbols and a second plurality of symbols, the first plurality of symbols having guard intervals of a first length and the second plurality of symbols having guard intervals of a second length;
a PHY rate detection unit communicatively coupled to the network interface, the PHY rate detection unit to determine, based at least in part on noise variability in the first plurality of symbols and the second plurality of symbols, that the first plurality of symbols have a preferred physical data rate; and
a guard interval selection unit to determine a length of a guard interval for subsequent data transmissions from the transmitter to the first device via the communication medium, based at least in part on the first length of the guard intervals associated with the first plurality of symbols having the preferred physical data rate, wherein the guard interval selection unit is further to in response to the noise variability being above a first high noise variability threshold, adjust the length of the guard interval to a first fraction of the guard interval.

20. The first device of claim 19, wherein the length of the guard interval is determined independent of guard intervals for other channels in the communication medium.

21. The first device of claim 20, wherein the length of the guard interval for the channel is different than a length of a guard interval of at least one other channel in the communication medium.

22. The first device of claim 19, wherein the guard interval selection unit is further to:

in response to the noise variability being above a second high noise variability threshold that is greater than the first high noise variability threshold, adjust the length of the guard interval to a second fraction of the guard interval, wherein the second fraction is greater than the first fraction.

23. The first device of claim 19, wherein the preferred physical data rate comprises a highest physical data rate.

24. A first device for data transmission comprising:
a network interface to receive, from a transmitter of a second device via a multipath channel of a communication medium, the data transmission;
a delay spread detection unit communicatively coupled to the network interface, the delay spread detection unit to determine a delay spread for the data transmission;
a noise detection unit communicatively coupled to the network interface, the noise detection unit to determine a noise level of the data transmission at the first device; and
a guard interval selection unit to, in response to the noise level being above a low noise threshold, determine a length of a guard interval for subsequent data transmissions from the transmitter to the first device via the communication medium, based at least in part on the delay spread and the noise level, wherein the guard interval selection unit is further to in response to a noise variability being above a first high noise variability threshold, determine to adjust the length of the guard interval to a first fraction of the delay spread.

25. The first device of claim 24, wherein the guard interval selection unit is further to:
in response to the noise level being below the low noise threshold, determine the length of the guard interval based at least in part on the delay spread and independent of the noise level.

26. The first device of claim 24, wherein the guard interval selection unit is further to:
in response to the noise variability being above a second high noise variability threshold that is greater than the first high noise variability threshold, determine to adjust the length of the guard interval to a second fraction of the delay spread, wherein the second fraction is greater than the first fraction.

27. A non-transitory machine-readable storage medium having instructions stored therein, which when executed by a processor causes the processor to perform operations that comprise:
receiving, at a receiver of a first device via a channel of a communication medium, multiple data transmissions;
determining, based at least in part on noise variability in the multiple data transmissions, a data transmission from among the multiple data transmissions having a preferred physical data rate;
determining, by the first device, a length of a guard interval for the channel for subsequent data transmissions from a transmitter of a second device to the receiver of the first device via the communication medium, based at least in part on a length of a guard interval of the data transmission having the preferred physical data rate;
determining, by the receiver of the first device, a noise variability of the data transmission having the preferred physical data rate; and
determining to adjust the length of the guard interval to a first fraction of the guard interval, in response to the noise variability of the data transmission having the preferred physical data rate being above a first high noise variability threshold.

28. The non-transitory machine-readable storage medium of claim 27, wherein determining the length of the guard interval is determining for the channel independent of determining a length of a guard interval for other channels in the communication medium.

29. The non-transitory machine-readable storage medium of claim 28, wherein the length of the guard interval for the channel is different than a length of a guard interval of at least one other channel in the communication medium.

30. The non-transitory machine-readable storage medium of claim 27, wherein the instructions, which when executed by the processor causes the processor to perform operations that comprise:
determining to adjust the length of the guard interval to a second fraction of the guard interval, wherein the second fraction is greater than the first fraction, in response to the noise variability being above a second high noise variability threshold that is greater than the first high noise variability threshold.

31. The non-transitory machine-readable storage medium of claim 27, wherein the preferred physical data rate comprises a highest physical data rate.

32. A first device for data communication comprising:
means for receiving, at a receiver of the first device, multiple data transmissions via a channel in a communication medium;
means for determining, based at least in part on noise variability in the multiple data transmissions, a data transmission from among the multiple data transmissions having a preferred physical data rate;
means for determining, by the first device, a length of a guard interval for the channel for subsequent data transmissions from a transmitter of a second device to the receiver of the first device via the communication medium, based at least in part on a length of the guard interval of the data transmission having the preferred physical data rate;
means for determining, by the receiver of the first device, a noise variability of the data transmission having the preferred physical data rate; and
means for determining to adjust, in response to the noise variability being above a first high noise variability threshold, the length of the guard interval to a first fraction of the guard interval.

33. The first device of claim 32, wherein the means for determining the length of the guard interval is independent of means for determining guard intervals for other channels in the communication medium.

34. The first device of claim 33, wherein the length of the guard interval for the channel is different than a length of a guard interval of at least one other channel in the communication medium.

35. The first device of claim 32, further comprising:
means for determining to adjust, in response to the noise variability being above a second high noise variability threshold that is greater than the first high noise variability threshold, the length of the guard interval to a second fraction of the guard interval, wherein the second fraction is greater than the first fraction.

36. The first device of claim 32, wherein the preferred physical data rate comprises a highest physical data rate.

37. A method for data communication comprising:
receiving, from a first device by a second device, a first indication of a length of a guard interval for subsequent data transmissions from a transmitter of the second device to a receiver of the first device via a communication medium, wherein the length of the guard interval is based, at least in part, on a length of a guard interval of a data transmission having a preferred physical data rate, wherein the preferred physical data rate is determined based, at least in part, on noise variability in multiple data transmissions via the communication medium;

setting, by the second device, the length of the guard interval for the subsequent data transmissions;

receiving, from the first device by the second device, a second indication of an adjustment to the length of the guard interval for subsequent data transmissions, wherein the adjustment is based, at least in part, on a noise variability of the data transmission having the preferred physical data rate being above a first high noise variability threshold; and adjusting, by the second device, the length of the guard interval for the subsequent data transmissions, based at least in part on the second indication.

38. The method of claim 37, further comprising:

receiving, from the first device by the second device, a third indication of an adjustment to the length of the guard interval for subsequent data transmissions, wherein the adjustment is based, at least in part, on a noise variability of the data transmission having the preferred physical data rate being above a second high noise variability threshold that is greater than the first high noise variability threshold; and adjusting, by the second device, the length of the guard interval for the subsequent data transmissions, based at least in part on the third indication.

39. The method of claim 37, wherein the preferred physical data rate comprises a highest physical data rate.

* * * * *